United States Patent
Duan et al.

(10) Patent No.: US 10,423,264 B2
(45) Date of Patent: Sep. 24, 2019

(54) SCREEN ENABLING METHOD AND APPARATUS, AND ELECTRONIC DEVICE

(71) Applicant: Huawei Technologies Co., Ltd., Shenzhen (CN)

(72) Inventors: Yun Duan, Wuhan (CN); Yong Chen, Wuhan (CN); Jie Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/579,506

(22) PCT Filed: Aug. 31, 2015

(86) PCT No.: PCT/CN2015/088655
§ 371 (c)(1),
(2) Date: Dec. 4, 2017

(87) PCT Pub. No.: WO2017/035756
PCT Pub. Date: Mar. 9, 2017

(65) Prior Publication Data
US 2018/0164939 A1  Jun. 14, 2018

(51) Int. Cl.
*G06F 3/041* (2006.01)
*G06F 3/048* (2013.01)
(Continued)

(52) U.S. Cl.
CPC ............ *G06F 3/0414* (2013.01); *G06F 3/048* (2013.01); *G06F 3/0488* (2013.01);
(Continued)

(58) Field of Classification Search
None
See application file for complete search history.

(56) References Cited

U.S. PATENT DOCUMENTS 9,417,754 B2 *  8/2016  Smith ................. G06F 3/0416
2011/0063248 A1 *  3/2011  Yoon .................. G06F 3/0485
345/174

(Continued)

FOREIGN PATENT DOCUMENTS

CN       101630223 A      1/2010
CN       101930341 A      12/2010
(Continued)

OTHER PUBLICATIONS

CN 201580042445.9, Office Action dated Jun. 5, 2019

*Primary Examiner* — Duane N Taylor, Jr.
(74) *Attorney, Agent, or Firm* — Leydig, Voit & Mayer, Ltd.

(57) ABSTRACT

A screen enabling method and apparatus, and an electronic device, where the method includes: detecting a first pressure value of a pressure operation performed on a touchscreen of the electronic device when a display screen of an electronic device is in a disabled state. The display screen includes first and second portions for displaying, in the first portion, first screen display data according to a first display attribute when the first pressure value is greater than or equal to a preset pressure operation threshold. The second portion is kept in a disabled state or is displayed in black. The first display attribute includes at least a display luminance.

20 Claims, 12 Drawing Sheets

(51) Int. Cl.
*G06F 3/0488* (2013.01)
*G09G 5/10* (2006.01)
*G09G 5/14* (2006.01)

(52) U.S. Cl.
CPC ........... *G06F 3/04886* (2013.01); *G09G 5/10* (2013.01); *G09G 5/14* (2013.01); *G06F 2203/04803* (2013.01); *G09G 2320/0686* (2013.01); *G09G 2354/00* (2013.01)

(56) References Cited

U.S. PATENT DOCUMENTS

| | | |
|---|---|---|
| 2015/0095829 A1 | 4/2015 | Uno |
| 2015/0185811 A1 | 7/2015 | Connell et al. |
| 2016/0054912 A1* | 2/2016 | Park ................... G06F 3/0488 |
| | | 715/709 |
| 2016/0062515 A1* | 3/2016 | Bae .................... G06F 3/0414 |
| | | 345/174 |

FOREIGN PATENT DOCUMENTS

| | | |
|---|---|---|
| CN | 102523318 A | 6/2012 |
| CN | 102594998 A | 7/2012 |
| CN | 103544920 A | 1/2014 |
| CN | 104020936 A | 9/2014 |
| EP | 2256610 A1 | 12/2010 |
| EP | 2631779 A1 | 8/2013 |
| JP | 2011118660 A | 6/2011 |
| JP | 2013156683 A | 8/2013 |
| WO | 2014002633 A1 | 1/2014 |
| WO | 2014146443 A1 | 9/2014 |

* cited by examiner

SCREEN ENABLING METHOD AND APPARATUS, AND ELECTRONIC DEVICE

CROSS-REFERENCE TO RELATED APPLICATIONS

This application is a national stage application of International Application No. PCT/CN2015/088655, filed on Aug. 31, 2015, which is hereby incorporated by reference in its entirety

TECHNICAL FIELD

Embodiments of the present invention relate to communications technologies, and in particular, to a screen enabling method and apparatus, and an electronic device.

BACKGROUND

At present, a screen enabling manner for a mobile phone is mainly implemented by a user by pressing a physical button (such as an on/off button) on the mobile phone to light a screen. Because a user often needs to use a mobile phone to view information such as time, a date, weather, and a notification, the mobile phone is lighted for dozens of times every day, and a screen of the mobile phone is disabled after information is viewed. As a result, the screen of the mobile phone is lighted and disabled for dozens of times every day.

A physical button is generally disposed on a frame or at the top of a mobile phone, and therefore, a user needs to enable or disable a screen only after finding and pressing the physical button. As large screens of mobile phones are prevalent, it is inconvenient to find a physical button during a one-hand operation.

SUMMARY

Embodiments of the present invention provide a screen enabling method and apparatus, and an electronic device, so as to improve convenience for a user in viewing information by using an electronic device.

According to a first aspect, an embodiment of the present invention provides a screen enabling method, including:

when a display screen of an electronic device is in a disabled state, detecting a first pressure value of a pressure operation performed on a touchscreen of the electronic device, where the display screen includes a first portion and a second portion; and displaying, in the first portion of the display screen, first screen display data according to a first display attribute when the first pressure value is greater than or equal to a preset pressure operation threshold, where the second portion keeps in a disabled state or is displayed in black, and the first display attribute includes at least a display luminance.

In a first possible implementation manner of the first aspect, before the displaying first screen display data, the method further includes:

determining the first screen display data according to the first pressure value and a preset first data association relationship, where the first data association relationship includes an association relationship between the pressure value and the screen display data.

With reference to the first aspect or the first possible implementation manner of the first aspect, in a second possible implementation manner, before the displaying first screen display data, the method further includes:

determining the first display attribute according to the first pressure value and a preset first display attribute association relationship, where the first display attribute association relationship includes an association relationship between the pressure value and the display attribute.

With reference to any one of the first aspect or the first or the second possible implementation manner of the first aspect, in a third possible implementation manner, before the displaying first screen display data, the method further includes:

obtaining a first contact location of the touchscreen, in which the pressure operation is performed, corresponding to a time when the first pressure value is greater than or equal to the preset pressure operation threshold; and determining a location, associated with the first contact location, of the first portion according to the first contact location.

With reference to any one of the first aspect or the first to the third possible implementation manners of the first aspect, in a fourth possible implementation manner, after the displaying first screen display data, the method further includes:

obtaining pressure duration of the pressure operation performed on the touchscreen;

when the pressure duration exceeds a preset minimum duration threshold, determining the second display attribute according to an obtained second pressure value of the pressure operation and the first display attribute association relationship, where the first display attribute association relationship includes an association relationship between the pressure value and the display attribute; and displaying, in the first portion of the display screen, the first screen display data according to the second display attribute.

With reference to any one of the first aspect or the first to the third possible implementation manners of the first aspect, in a fifth possible implementation manner, after the displaying first screen display data, the method further includes:

obtaining pressure duration of the pressure operation performed on the touchscreen;

when the pressure duration exceeds a preset minimum duration threshold, determining the second screen display data according to an obtained second pressure value of the pressure operation and the first data association relationship, where the first data association relationship includes an association relationship between the pressure value and the screen display data; and displaying, in the first portion of the display screen, the second screen display data according to the first display attribute, and stopping displaying the first screen display data.

With reference to any one of the first aspect or the first to the third possible implementation manners of the first aspect, in a sixth possible implementation manner, after the displaying first screen display data, the method further includes:

obtaining pressure duration of the pressure operation performed on the touchscreen;

when the pressure duration exceeds a preset minimum duration threshold, determining the second display attribute according to an obtained second pressure value of the pressure operation and the first display attribute association relationship, where the first display attribute association relationship includes an association relationship between the pressure value and the display attribute;

determining the second screen display data according to the obtained second pressure value and the first data association relationship, where the first data association relationship includes an association relationship between the pressure value and the screen display data; and displaying, in the first portion of the display screen, the second screen display data according to the second display attribute, and stopping displaying the first screen display data.

With reference to the sixth possible implementation manner of the first aspect, in a seventh possible implementation manner, the displaying, in the first portion of the display screen, first screen display data according to a first display attribute includes:

displaying, in the preset first portion of the display screen, the preset first screen display data according to the preset first display luminance, where the first display attribute association relationship includes an association relationship between the pressure value and the display luminance, and an increase of the pressure value is corresponding to an increase of the display luminance; and the first data association relationship includes an association relationship between the pressure value and the screen display data, and an increase of the pressure value is corresponding to an increase of the screen display data;

the determining the second display attribute according to an obtained second pressure value of the pressure operation and the first display attribute association relationship includes:

determining the second display luminance according to the obtained second pressure value of the pressure operation and the first display attribute association relationship; and the displaying, in the first portion of the display screen, the second screen display data according to the second display attribute, and stopping displaying the first screen display data includes:

displaying, in the first portion of the display screen, the second screen display data according to the second display luminance, and stopping displaying the first screen display data.

With reference to any one of the first aspect or the first to the third possible implementation manners of the first aspect, in an eighth possible implementation manner, after the displaying first screen display data, the method further includes:

obtaining pressure duration of the pressure operation performed on the touchscreen;

when the pressure duration exceeds a preset minimum duration threshold, determining the second display attribute according to the first pressure value, the pressure duration, and a preset second display attribute association relationship, where the second display attribute association relationship includes an association relationship between the first pressure value, the pressure duration, and the display attribute; and displaying, in the first portion of the display screen, the first screen display data according to the second display attribute.

With reference to any one of the first aspect or the first to the third possible implementation manners of the first aspect, in a ninth possible implementation manner, after the displaying first screen display data, the method further includes:

obtaining pressure duration of the pressure operation performed on the touchscreen;

when the pressure duration exceeds a preset minimum duration threshold, determining the second screen display data according to the first pressure value, the pressure duration, and a preset second data association relationship, where the second data association relationship includes an association relationship between the first pressure value, the pressure duration, and the screen display data; and displaying, in the first portion of the display screen, the second screen display data according to the first display attribute, and stopping displaying the first screen display data.

With reference to any one of the first aspect or the first to the third possible implementation manners of the first aspect, in a tenth possible implementation manner, after the displaying first screen display data, the method further includes:

obtaining pressure duration of the pressure operation performed on the touchscreen;

when the pressure duration exceeds a preset minimum duration threshold, determining the second display attribute according to the first pressure value, the pressure duration, and a preset second display attribute association relationship, where the second display attribute association relationship includes an association relationship between the first pressure value, the pressure duration, and the display attribute;

determining the second screen display data according to the first pressure value, the pressure duration, and a preset second data association relationship, where the second data association relationship includes an association relationship between the first pressure value, the pressure duration, and the screen display data; and displaying, in the first portion of the display screen, the second screen display data according to the second display attribute, and stopping displaying the first screen display data.

With reference to any one of the first aspect or the first to the third possible implementation manners of the first aspect, in an eleventh possible implementation manner, after the displaying first screen display data, the method further includes:

obtaining, within a preset time period, a first operation performed on the display screen;

determining the second display attribute according to the first pressure value, the first operation, and a preset third display attribute association relationship, where the third display attribute association relationship includes an association relationship between the first pressure value, the first operation, and the display attribute; and displaying, in the first portion of the display screen, the first screen display data according to the second display attribute.

With reference to any one of the first aspect or the first to the third possible implementation manners of the first aspect, in a twelfth possible implementation manner, after the displaying first screen display data, the method further includes:

obtaining, within a preset time period, a first operation performed on the display screen;

determining second screen display data according to the first pressure value, the first operation, and a preset third data association relationship, where the third data association relationship includes an association relationship between the first pressure value, the first operation, and the screen display data; and displaying, in the first portion of the display screen, the second screen display data according to the first display attribute, and stopping displaying the first screen display data.

With reference to any one of the first aspect or the first to the third possible implementation manners of the first aspect, in a thirteenth possible implementation manner, after the displaying first screen display data, the method further includes:

obtaining, within a preset time period, a first operation performed on the display screen;

determining a second display attribute according to the first pressure value, the first operation, and a preset third display attribute association relationship, where the third display attribute association relationship includes an association relationship between the first pressure value, the first operation, and the display attribute;

determining second screen display data according to the first pressure value, the first operation, and a preset third data association relationship, where the third data association relationship includes an association relationship between the first pressure value, the first operation, and the screen display data; and displaying, in the first portion of the display screen, the second screen display data according to the second display attribute, and stopping displaying the first screen display data.

In a fourteenth possible implementation manner of the first aspect, the displaying, in the first portion of the display screen, first screen display data according to a first display attribute when the first pressure value is greater than or equal to a preset pressure operation threshold includes:

when the first pressure value is greater than or equal to the preset pressure operation threshold, obtaining a first contact location of the touchscreen, in which the pressure operation is performed, corresponding to a time when the first pressure value is greater than or equal to the preset pressure operation threshold;

determining a first location, associated with the first contact location, of the first portion according to the first contact location;

determining the first screen display data according to the first location of the first portion and a preset lock-screen theme interface, where the first screen display data is screen display data, corresponding to the first location of the first portion, on the lock-screen theme interface; and displaying, in the first location of the first portion of the display screen, the first screen display data.

With reference to the fourteenth possible implementation manner of the first aspect, in a fifteenth possible implementation manner, after the displaying first screen display data, the method further includes:

when a contact moves in a process in which the pressure operation is continuously performed on the touchscreen, obtaining a second contact location corresponding to a time when movement of the contact for the pressure operation stops;

determining a second location, associated with the second contact location, of the first portion according to the second contact location;

determining the second screen display data according to the second location of the first portion and the preset lock-screen theme interface, where the second screen display data is screen display data, corresponding to the second location of the first portion, on the lock-screen theme interface; and displaying, in the second location of the first portion of the display screen, the second screen display data.

According to a second aspect, an embodiment of the present invention provides a screen enabling apparatus, including:

a detection module, configured to: when a display screen of an electronic device is in a disabled state, detect a first pressure value of a pressure operation performed on a touchscreen of the electronic device, where the display screen includes a first portion and a second portion;

a processing module, configured to: when the first pressure value is greater than or equal to a preset pressure operation threshold, determine to display, in the first portion of the display screen, first screen display data according to a first display attribute, where the first display attribute includes at least a display luminance; and a display module, configured to display, in the first portion of the display screen, the first screen display data according to the first display attribute, where the second portion keeps in a disabled state or is displayed in black.

In a first possible implementation manner of the second aspect, the processing module is further configured to:

determine the first screen display data according to the first pressure value and a preset first data association relationship, where the first data association relationship includes an association relationship between the pressure value and the screen display data.

With reference to the second aspect or the first possible implementation manner of the second aspect, in a second possible implementation manner, the processing module is further configured to:

determine the first display attribute according to the first pressure value and a preset first display attribute association relationship, where the first display attribute association relationship includes an association relationship between the pressure value and the display attribute.

With reference to any one of the second aspect or the first or the second possible implementation manner of the second aspect, in a third possible implementation manner, the detection module is further configured to:

obtain a first contact location of the touchscreen, in which the pressure operation is performed, corresponding to a time when the first pressure value is greater than or equal to the preset pressure operation threshold; and the processing module is further configured to:

determine a location, associated with the first contact location, of the first portion according to the first contact location.

With reference to any one of the second aspect or the first to the third possible implementation manners of the second aspect, in a fourth possible implementation manner, the detection module is further configured to:

obtain pressure duration of the pressure operation performed on the touchscreen;

the processing module is further configured to:

when the pressure duration exceeds a preset minimum duration threshold, determine the second display attribute according to an obtained second pressure value of the pressure operation and the first display attribute association relationship, where the first display attribute association relationship includes an association relationship between the pressure value and the display attribute; and the display module is further configured to:

display, in the first portion of the display screen, the first screen display data according to the second display attribute.

With reference to any one of the second aspect or the first to the third possible implementation manners of the second aspect, in a fifth possible implementation manner, the detection module is further configured to:

obtain pressure duration of the pressure operation performed on the touchscreen;

the processing module is further configured to:

when the pressure duration exceeds a preset minimum duration threshold, determine the second screen display data according to an obtained second pressure value of the pressure operation and the first data association relationship, where the first data association relationship includes an association relationship between the pressure value and the screen display data; and the display module is further configured to:

display, in the first portion of the display screen, the second screen display data according to the first display attribute, and stop displaying the first screen display data.

With reference to any one of the second aspect or the first to the third possible implementation manners of the second aspect, in a sixth possible implementation manner, the detection module is further configured to:

obtain pressure duration of the pressure operation performed on the touchscreen;

the processing module is further configured to:

when the pressure duration exceeds a preset minimum duration threshold, determine the second display attribute according to an obtained second pressure value of the pressure operation and the first display attribute association relationship, where the first display attribute association relationship includes an association relationship between the pressure value and the display attribute; and determine the second screen display data according to the obtained second pressure value and the first data association relationship, where the first data association relationship includes an association relationship between the pressure value and the screen display data; and the display module is further configured to:

display, in the first portion of the display screen, the second screen display data according to the second display attribute, and stop displaying the first screen display data.

With reference to the sixth possible implementation manner of the second aspect, in a seventh possible implementation manner, the processing module is further configured to:

when the first pressure value is greater than or equal to the preset pressure operation threshold, determine to display, in the preset first portion of the display screen, the preset first screen display data according to the preset first display luminance, where the first display attribute association relationship includes an association relationship between the pressure value and the display luminance, and an increase of the pressure value is corresponding to an increase of the display luminance; and the first data association relationship includes an association relationship between the pressure value and the screen display data, and an increase of the pressure value is corresponding to an increase of the screen display data;

the processing module is further configured to:

determine the second display luminance according to the obtained second pressure value of the pressure operation and the first display attribute association relationship; and the display module is further configured to:

display, in the first portion of the display screen, the second screen display data according to the second display luminance, and stop displaying the first screen display data.

With reference to any one of the second aspect or the first to the third possible implementation manners of the second aspect, in an eighth possible implementation manner, the detection module is further configured to:

obtain pressure duration of the pressure operation performed on the touchscreen;

the processing module is further configured to:

when the pressure duration exceeds a preset minimum duration threshold, determine the second display attribute according to the first pressure value, the pressure duration, and a preset second display attribute association relationship, where the second display attribute association relationship includes an association relationship between the first pressure value, the pressure duration, and the display attribute; and the display module is further configured to:

display, in the first portion of the display screen, the first screen display data according to the second display attribute.

With reference to any one of the second aspect or the first to the third possible implementation manners of the second aspect, in a ninth possible implementation manner, the detection module is further configured to:

obtain pressure duration of the pressure operation performed on the touchscreen;

the processing module is further configured to:

when the pressure duration exceeds a preset minimum duration threshold, determine the second screen display data according to the first pressure value, the pressure duration, and a preset second data association relationship, where the second data association relationship includes an association relationship between the first pressure value, the pressure duration, and the screen display data; and the display module is further configured to:

display, in the first portion of the display screen, the second screen display data according to the first display attribute, and stop displaying the first screen display data.

With reference to any one of the second aspect or the first to the third possible implementation manners of the second aspect, in a tenth possible implementation manner, the detection module is further configured to:

obtain pressure duration of the pressure operation performed on the touchscreen;

the processing module is further configured to:

when the pressure duration exceeds a preset minimum duration threshold, determine the second display attribute according to the first pressure value, the pressure duration, and a preset second display attribute association relationship, where the second display attribute association relationship includes an association relationship between the first pressure value, the pressure duration, and the display attribute; and determine the second screen display data according to the first pressure value, the pressure duration, and a preset second data association relationship, where the second data association relationship includes an association relationship between the first pressure value, the pressure duration, and the screen display data; and the display module is further configured to:

display, in the first portion of the display screen, the second screen display data according to the second display attribute, and stop displaying the first screen display data.

With reference to any one of the second aspect or the first to the third possible implementation manners of the second aspect, in an eleventh possible implementation manner, the detection module is further configured to:

obtain, within a preset time period, a first operation performed on the display screen;

the processing module is further configured to:

determine the second display attribute according to the first pressure value, the first operation, and a preset third display attribute association relationship, where the third display attribute association relationship includes an association relationship between the first pressure value, the first operation, and the display attribute; and the display module is further configured to:

display, in the first portion of the display screen, the first screen display data according to the second display attribute.

With reference to any one of the second aspect or the first to the third possible implementation manners of the second aspect, in a twelfth possible implementation manner, the detection module is further configured to:

obtain, within a preset time period, a first operation performed on the display screen;

the processing module is further configured to:

determine second screen display data according to the first pressure value, the first operation, and a preset third data association relationship, where the third data association relationship includes an association relationship between the first pressure value, the first operation, and the screen display data; and the display module is further configured to:

display, in the first portion of the display screen, the second screen display data according to the first display attribute, and stop displaying the first screen display data.

With reference to any one of the second aspect or the first to the third possible implementation manners of the second aspect, in a thirteenth possible implementation manner, the detection module is further configured to:

obtain, within a preset time period, a first operation performed on the display screen;

the processing module is further configured to:

determine a second display attribute according to the first pressure value, the first operation, and a preset third display attribute association relationship, where the third display attribute association relationship includes an association relationship between the first pressure value, the first operation, and the display attribute; and determine second screen display data according to the first pressure value, the first operation, and a preset third data association relationship, where the third data association relationship includes an association relationship between the first pressure value, the first operation, and the screen display data; and the display module is further configured to:

display, in the first portion of the display screen, the second screen display data according to the second display attribute, and stop displaying the first screen display data.

In a fourteenth possible implementation manner of the second aspect, the detection module is further configured to:

when the first pressure value is greater than or equal to the preset pressure operation threshold, obtain a first contact location of the touchscreen, in which the pressure operation is performed, corresponding to a time when the first pressure value is greater than or equal to the preset pressure operation threshold;

the processing module is further configured to:

determine a first location, associated with the first contact location, of the first portion according to the first contact location; and determine the first screen display data according to the first location of the first portion and a preset lock-screen theme interface, where the first screen display data is screen display data, corresponding to the first location of the first portion, on the lock-screen theme interface; and the display module is further configured to:

display, in the first location of the first portion of the display screen, the first screen display data.

With reference to the fourteenth possible implementation manner of the second aspect, in a fifteenth possible implementation manner, the detection module is further configured to:

when a contact moves in a process in which the pressure operation is continuously performed on the touchscreen, obtain a second contact location corresponding to a time when movement of the contact for the pressure operation stops;

the processing module is further configured to:

determine a second location, associated with the second contact location, of the first portion according to the second contact location; and determine the second screen display data according to the second location of the first portion and the preset lock-screen theme interface, where the second screen display data is screen display data, corresponding to the second location of the first portion, on the lock-screen theme interface; and the display module is further configured to:

display, in the second location of the first portion of the display screen, the second screen display data.

According to a third aspect, an embodiment of the present invention provides an electronic device, including:

a touchscreen, configured to: when a display screen of the electronic device is in a disabled state, detect a first pressure value of a pressure operation performed on the touchscreen of the electronic device, where the display screen includes a first portion and a second portion;

a processor, configured to: when the first pressure value is greater than or equal to a preset pressure operation threshold, determine to display, in the first portion of the display screen, first screen display data according to a first display attribute, where the first display attribute includes at least a display luminance; and the display screen, configured to display, in the first portion of the display screen, the first screen display data according to the first display attribute, where the second portion keeps in a disabled state or is displayed in black.

In a first possible implementation manner of the third aspect, the processor is further configured to:

determine the first screen display data according to the first pressure value and a preset first data association relationship, where the first data association relationship includes an association relationship between the pressure value and the screen display data.

With reference to the third aspect or the first possible implementation manner of the third aspect, in a second possible implementation manner, the processor is further configured to:

determine the first display attribute according to the first pressure value and a preset first display attribute association relationship, where the first display attribute association relationship includes an association relationship between the pressure value and the display attribute.

With reference to any one of the third aspect or the first or the second possible implementation manner of the third aspect, in a third possible implementation manner, the touchscreen is further configured to:

obtain a first contact location of the touchscreen, in which the pressure operation is performed, corresponding to a time when the first pressure value is greater than or equal to the preset pressure operation threshold; and the processor is further configured to:

determine a location, associated with the first contact location, of the first portion according to the first contact location.

With reference to any one of the third aspect or the first to the third possible implementation manners of the third aspect, in a fourth possible implementation manner, the touchscreen is further configured to:

obtain pressure duration of the pressure operation performed on the touchscreen;

the processor is further configured to:

when the pressure duration exceeds a preset minimum duration threshold, determine the second display attribute according to an obtained second pressure value of the pressure operation and the first display attribute association relationship, where the first display attribute association relationship includes an association relationship between the pressure value and the display attribute; and the display screen is further configured to:

display, in the first portion of the display screen, the first screen display data according to the second display attribute.

With reference to any one of the third aspect or the first to the third possible implementation manners of the third aspect, in a fifth possible implementation manner, the touchscreen is further configured to:

obtain pressure duration of the pressure operation performed on the touchscreen;

the processor is further configured to:

when the pressure duration exceeds a preset minimum duration threshold, determine the second screen display data according to an obtained second pressure value of the pressure operation and the first data association relationship, where the first data association relationship includes an association relationship between the pressure value and the screen display data; and the display screen is further configured to:

display, in the first portion of the display screen, the second screen display data according to the first display attribute, and stop displaying the first screen display data.

With reference to any one of the third aspect or the first to the third possible implementation manners of the third aspect, in a sixth possible implementation manner, the touchscreen is further configured to:

obtain pressure duration of the pressure operation performed on the touchscreen;

the processor is further configured to:

when the pressure duration exceeds a preset minimum duration threshold, determine the second display attribute according to an obtained second pressure value of the pressure operation and the first display attribute association relationship, where the first display attribute association relationship includes an association relationship between the pressure value and the display attribute; and determine the second screen display data according to the obtained second pressure value and the first data association relationship, where the first data association relationship includes an association relationship between the pressure value and the screen display data; and the display screen is further configured to:

display, in the first portion of the display screen, the second screen display data according to the second display attribute, and stop displaying the first screen display data.

With reference to the sixth possible implementation manner of the third aspect, in a seventh possible implementation manner, the processor is further configured to:

when the first pressure value is greater than or equal to the preset pressure operation threshold, determine to display, in the preset first portion of the display screen, the preset first screen display data according to the preset first display luminance, where the first display attribute association relationship includes an association relationship between the pressure value and the display luminance, and an increase of the pressure value is corresponding to an increase of the display luminance; and the first data association relationship includes an association relationship between the pressure value and the screen display data, and an increase of the pressure value is corresponding to an increase of the screen display data;

the processor is further configured to:

determine the second display luminance according to the obtained second pressure value of the pressure operation and the first display attribute association relationship; and the display screen is further configured to:

display, in the first portion of the display screen, the second screen display data according to the second display luminance, and stop displaying the first screen display data.

With reference to any one of the third aspect or the first to the third possible implementation manners of the third aspect, in an eighth possible implementation manner, the touchscreen is further configured to:

obtain pressure duration of the pressure operation performed on the touchscreen;

the processor is further configured to:

when the pressure duration exceeds a preset minimum duration threshold, determine the second display attribute according to the first pressure value, the pressure duration, and a preset second display attribute association relationship, where the second display attribute association relationship includes an association relationship between the first pressure value, the pressure duration, and the display attribute; and the display screen is further configured to:

display, in the first portion of the display screen, the first screen display data according to the second display attribute.

With reference to any one of the third aspect or the first to the third possible implementation manners of the third aspect, in a ninth possible implementation manner, the touchscreen is further configured to:

obtain pressure duration of the pressure operation performed on the touchscreen;

the processor is further configured to:

when the pressure duration exceeds a preset minimum duration threshold, determine the second screen display data according to the first pressure value, the pressure duration, and a preset second data association relationship, where the second data association relationship includes an association relationship between the first pressure value, the pressure duration, and the screen display data; and the display screen is further configured to:

display, in the first portion of the display screen, the second screen display data according to the first display attribute, and stop displaying the first screen display data.

With reference to any one of the third aspect or the first to the third possible implementation manners of the third aspect, in a tenth possible implementation manner, the touchscreen is further configured to:

obtain pressure duration of the pressure operation performed on the touchscreen;

the processor is further configured to:

when the pressure duration exceeds a preset minimum duration threshold, determine the second display attribute according to the first pressure value, the pressure duration, and a preset second display attribute association relationship, where the second display attribute association relationship includes an association relationship between the first pressure value, the pressure duration, and the display attribute; and determine the second screen display data according to the first pressure value, the pressure duration, and a preset second data association relationship, where the second data association relationship includes an association relationship between the first pressure value, the pressure duration, and the screen display data; and the display screen is further configured to:

display, in the first portion of the display screen, the second screen display data according to the second display attribute, and stop displaying the first screen display data.

With reference to any one of the third aspect or the first to the third possible implementation manners of the third aspect, in an eleventh possible implementation manner, the touchscreen is further configured to:

obtain, within a preset time period, a first operation performed on the display screen;

the processor is further configured to:

determine the second display attribute according to the first pressure value, the first operation, and a preset third display attribute association relationship, where the third display attribute association relationship includes an association relationship between the first pressure value, the first operation, and the display attribute; and the display screen is further configured to:

display, in the first portion of the display screen, the first screen display data according to the second display attribute.

With reference to any one of the third aspect or the first to the third possible implementation manners of the third aspect, in a twelfth possible implementation manner, the touchscreen is further configured to:

obtain, within a preset time period, a first operation performed on the display screen;

the processor is further configured to:

determine second screen display data according to the first pressure value, the first operation, and a preset third data association relationship, where the third data association relationship includes an association relationship between the first pressure value, the first operation, and the screen display data; and the display screen is further configured to:

display, in the first portion of the display screen, the second screen display data according to the first display attribute, and stop displaying the first screen display data.

With reference to any one of the third aspect or the first to the third possible implementation manners of the third aspect, in a thirteenth possible implementation manner, the touchscreen is further configured to:

obtain, within a preset time period, a first operation performed on the display screen;

the processor is further configured to:

determine a second display attribute according to the first pressure value, the first operation, and a preset third display attribute association relationship, where the third display attribute association relationship includes an association relationship between the first pressure value, the first operation, and the display attribute; and determine second screen display data according to the first pressure value, the first operation, and a preset third data association relationship, where the third data association relationship includes an association relationship between the first pressure value, the first operation, and the screen display data; and the display screen is further configured to:

display, in the first portion of the display screen, the second screen display data according to the second display attribute, and stop displaying the first screen display data.

In a fourteenth possible implementation manner of the third aspect, the touchscreen is further configured to:

when the first pressure value is greater than or equal to the preset pressure operation threshold, obtain a first contact location of the touchscreen, in which the pressure operation is performed, corresponding to a time when the first pressure value is greater than or equal to the preset pressure operation threshold;

the processor is further configured to:

determine a first location, associated with the first contact location, of the first portion according to the first contact location; and determine the first screen display data according to the first location of the first portion and a preset lock-screen theme interface, where the first screen display data is screen display data, corresponding to the first location of the first portion, on the lock-screen theme interface; and the display screen is further configured to:

display, in the first location of the first portion of the display screen, the first screen display data.

With reference to the fourteenth possible implementation manner of the third aspect, in a fifteenth possible implementation manner, the touchscreen is further configured to:

when a contact moves in a process in which the pressure operation is continuously performed on the touchscreen, obtain a second contact location corresponding to a time when movement of the contact for the pressure operation stops;

the processor is further configured to:

determine a second location, associated with the second contact location, of the first portion according to the second contact location; and determine the second screen display data according to the second location of the first portion and the preset lock-screen theme interface, where the second screen display data is screen display data, corresponding to the second location of the first portion, on the lock-screen theme interface; and the display screen is further configured to:

display, in the second location of the first portion of the display screen, the second screen display data.

In the embodiments of the present invention, when a display screen of an electronic device is in a disabled state, a first pressure value of a pressure operation performed on a touchscreen is obtained; and when the first pressure value is greater than or equal to a preset pressure operation threshold, the display screen is partially lighted to display screen display data. If the pressure operation continues to be performed on the touchscreen after the display screen is partially lighted, pressure duration is prolonged or the pressure value changes, or a preset first operation is performed on the touchscreen within a preset time period after the pressure operation ends. In this case, screen display data and/or a display attribute are/is determined according to the changed operation. The display screen is partially lighted by pressing the touchscreen, so that a user can view information of interest without fully lighting the display screen, thereby reducing power consumption caused by display in full screen. The pressure operation performed on the touchscreen continues or changes, or a new operation is performed, so that the screen display data and/or the display attribute change/changes correspondingly, thereby improving intelligence of human-machine interaction.

BRIEF DESCRIPTION OF DRAWINGS

To describe the technical solutions in the embodiments of the present invention or in the conventional art more clearly, the following briefly describes the accompanying drawings required for describing the embodiments or the conventional art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
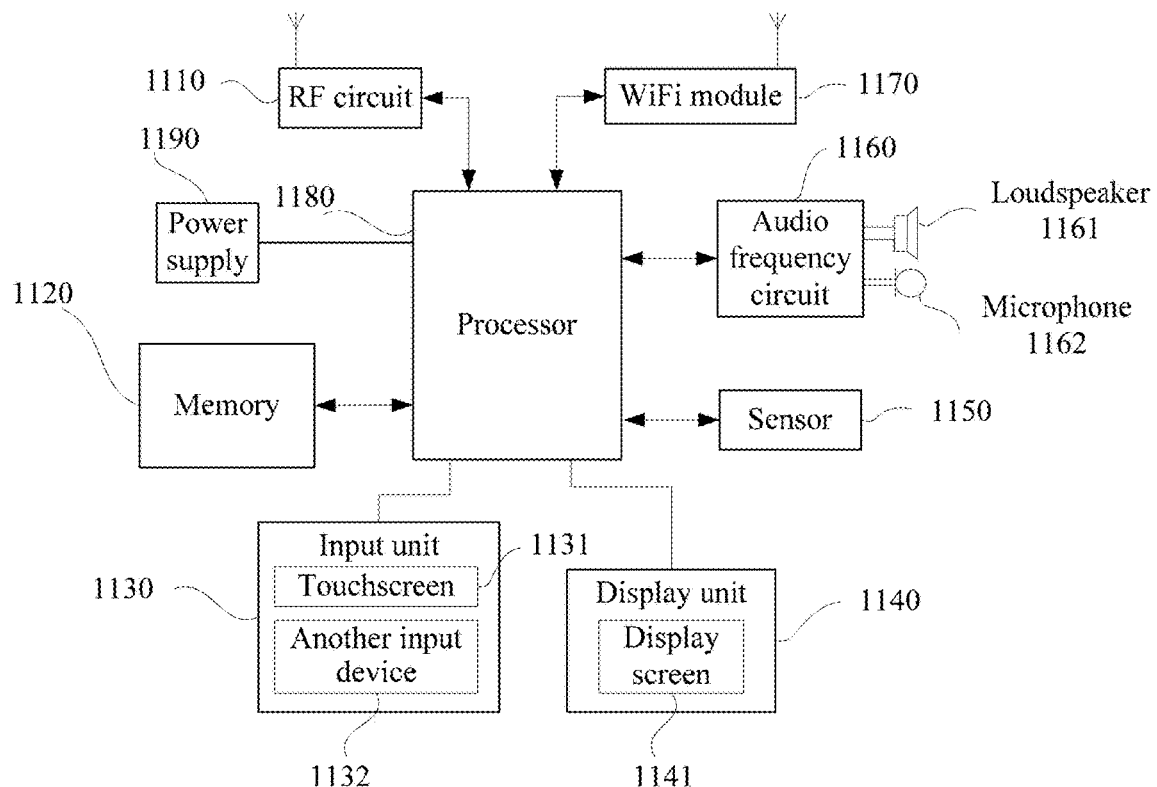
FIG. 1 is a schematic structural diagram of an electronic device according to an embodiment of the present invention.

FIG. 1 is a schematic structural diagram of an electronic device according to an embodiment of the present invention. An electronic device 100 includes components such as a radio frequency (RF) circuit 1110, a memory 1120, an input unit 1130, a display unit 1140, a sensor 1150, an audio frequency circuit 1160, a Wireless Fidelity (WiFi) module 1170, a processor 1180, and a power supply 1190. These components perform communication by using one or more communications buses or signal cables. The electronic device 100 may be any electronic device, includes but is not limited to a handheld computer, a tablet computer, a mobile phone, a media player, or a personal digital assistant (PDA), or includes a combination of two or more devices thereof. Persons skilled in the art may understand that a structure of the device shown in FIG. 1 does not constitute any limitation on the electronic device, and the electronic device may include components more or fewer than those shown in the diagram, or a combination of some components, or components disposed differently.

The following describes each constituent part of the electronic device 100 in detail with reference to FIG. 1.

The RF circuit 1110 may be configured to: receive and send a signal in an information receiving and sending process or a call process; and in particular, after receiving downlink information of a base station, send the downlink information to the processor 1180 for processing; in addition, send uplink data to the base station. Generally, the RF circuit includes but is not limited to an antenna, at least one amplifier, a transceiver, a coupler, a low noise amplifier (Low Noise Amplifier, LNA), and a duplexer. In addition, the RF circuit 1110 may further communicate with a network and another device by means of wireless communication. For the wireless communication, any communications standard or protocol may be used, including but not limited to Global System for Mobile Communications (Global System of Mobile communication, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, and a short message service (Short Messaging Service, SMS).

The memory 1120 may be configured to store a software program and a module, and the processor 1180 performs various function applications of the electronic device and data processing by running the software program and the module that are stored in the memory 1120. The memory 1120 may mainly include a program storage portion and a data storage portion. The program storage portion may store an operating system, an application program required by at least one function (such as a voice playback function and an image playback function), and the like; and the data storage portion may store data (such as audio data and a phone book) created according to use of the electronic device, and the like. In addition, the memory 1120 may include a high-speed random access memory, and may further include a non-volatile memory, such as at least one magnetic disk storage device, a flash memory device, or another volatile solid-state storage device.

The input unit 1130 may be configured to receive entered gesture information, digit information, or character information, and generate key signal input related to user setting and function control of the electronic device 100. Specifically, the input unit 1130 may include a touchscreen 1131 and another input device 1132. The touchscreen 1131 may collect a touch control operation (such as an operation performed by a user on the touchscreen 1131 or near the touchscreen 1131 by using any proper object or accessory, such as a finger or a stylus) performed by the user on or near the touchscreen 1131, and drive a corresponding connection apparatus according to a preset program. Specifically, the touch control operation may include the following one or more operation manners: a pressure operation, a touch operation (such as a slide operation or a drag operation), a tap operation, a multi-contact operation, a button input, a touch and hold input, or the like. Optionally, the touchscreen 1131 may include a touch sensor (Touch Sensor) and/or a pressure sensor (Force Sensor), or a component having a similar function, which is configured to: detect a touch signal and/or a pressure signal of the user, convert the touch signal into contact coordinates and other touch information, convert the pressure signal into a pressure value and other pressure information, send the foregoing information to the processor 1180, and receive a command sent by the processor 1180 and execute the command. In addition, the touchscreen 1131 may be implemented by using multiple types, such as a resistive type, a capacitive type, an infrared type, and a surface acoustic wave type. In addition to the touchscreen 1131, the input unit 1130 may include the another input device 1132. Specifically, the another input device 1132 may include but is not limited to one or more of a physical keyboard, a function key (such as a volume control key or a switch key), a trackball, a mouse, or a joystick.

The display unit 1140 may be configured to display information entered by the user or information provided for the user, and various menus of the electronic device. The display unit 1140 may include a display screen 1141. Optionally, the display screen 1141 may be configured in a form of a liquid crystal display (LCD), an organic light-emitting diode (OLED), and the like. Further, the touchscreen 1131 may cover the display screen 1141. After detecting a touch operation on or near the touchscreen 1131, the touchscreen 1131 transmits information about the touch operation to the processor 1180 to determine a touch event type, and then the processor 1180 provides corresponding visual output on the display screen 1141 according to the touch event type. In FIG. 1, the touchscreen 1131 and the display screen 1141 are used as two independent components to implement input and input functions of the electronic device. However, in some embodiments, the touchscreen 1131 and the display screen 1141 may be integrated to implement the input and output functions of the electronic device.

The electronic device may further include at least one sensor 1150, such as a light sensor, a motion sensor, or another sensor. The light sensor may include an ambient light sensor and a proximity sensor. The ambient light sensor may adjust a luminance of the display screen 1141 according to brightness of ambient light, and the light sensor may disable the display screen 1141 and/or backlight when the electronic device moves to an ear. As a type of motion sensor, an acceleration sensor may detect values of acceleration in directions (generally three axes), may detect, in a static state, a value and a direction of gravity, and may be used for an application that identifies a posture (such as screen switching between a landscape mode and a portrait mode, a related game, and magnetometer posture calibration) of the electronic device, a vibration-identification-related function (such as a pedometer and tapping), and the like. Other sensors that can be configured on the electronic device such as a gyroscope, a barometer, a hygrometer, a thermometer, and an infrared sensor are not described herein.

The audio frequency circuit 1160, a loudspeaker 1161, and a microphone 1162 may provide an audio interface between the user and the electronic device. The audio frequency circuit 1160 may transmit, to the loudspeaker 1161, an electrical signal that is obtained after conversion of received audio data, and the loudspeaker 1161 converts the electrical signal into a sound signal and outputs the sound signal. In addition, the microphone 1162 converts a collected sound signal into an electrical signal; the audio frequency circuit 1160 receives and converts the electrical signal into audio data, and outputs the audio data to the processor 1180 for processing, and then processed audio data is sent to, for example, another electronic device by using the RF circuit 1110, or the audio data is output to the memory 1120 for further processing.

Figure 7:
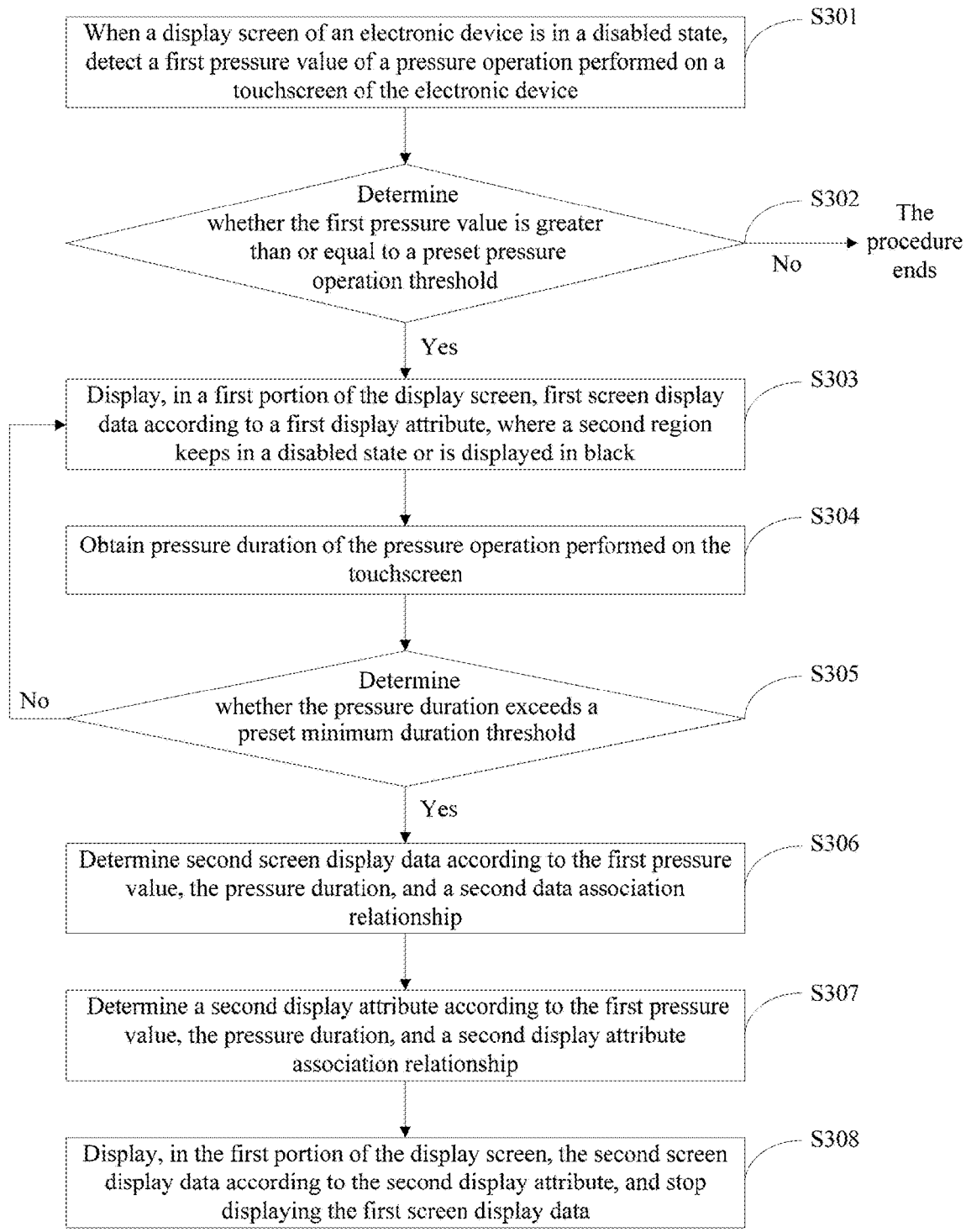
FIG. 7 is a schematic flowchart of another screen enabling method according to an embodiment of the present invention.

WiFi belongs to a short-distance wireless transmission technology. By using the WiFi module 1170, the electronic device may help the user receive and send an email, browse a web page, access streaming media, and the like. The WiFi module 1170 provides wireless access to the broadband Internet for the user. Although FIG. 7 shows the WiFi module 1170, it can be understood that the WiFi module 1170 is not a mandatory constituent of the electronic device, and may totally be omitted according to a requirement without changing the essence scope of the present invention.

The processor 1180 is a control center of the electronic device, is connected to all the parts of the entire electronic device by using various interfaces and lines, and executes, by running or executing the software program and/or the module that are/is stored in the memory 1120 and by invoking data stored in the memory 1120, various functions of the electronic device and data processing, so as to perform overall monitoring on the electronic device. Optionally, the processor 1180 may include one or more processing units. Preferably, an application processor and a modem processor may be integrated into the processor 1180. The application processor mainly processes an operating system, a user interface, an application program, and the like. The modem processor mainly processes wireless communication. It can be understood that the foregoing modem processor may alternatively not be integrated into the processor 1180.

The electronic device further includes the power supply 1190 (such as a battery) that supplies power to all the components. Preferably, the power supply may be logically connected to the processor 1180 by using a power management system, so that functions such as charging and discharging management and power consumption management are implemented by using the power management system.

Although not shown, the electronic device may further include a camera, a Bluetooth module, a GPS module, and the like, and details are not described herein.

Figure 2:
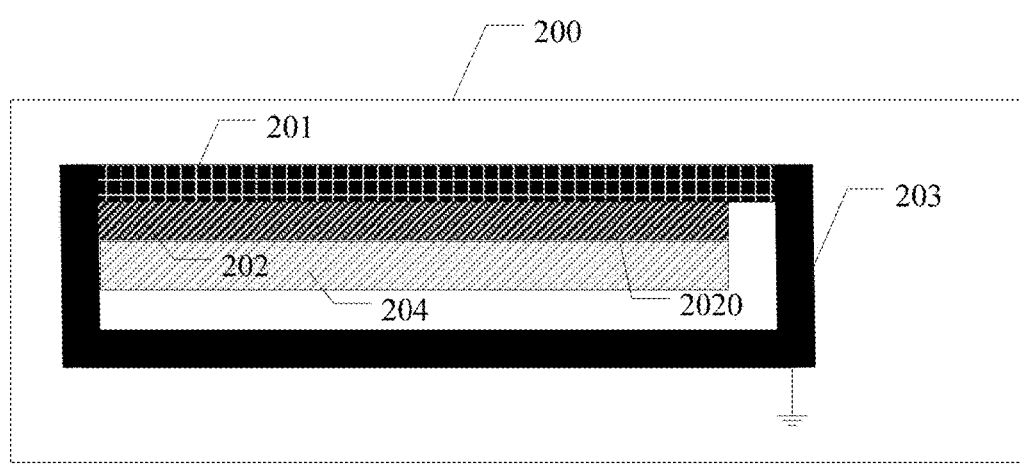
FIG. 2 is a schematic structural diagram of a screen of another electronic device according to an embodiment of the present invention.

In an example, FIG. 2 is a schematic structural diagram of a screen of another electronic device according to an embodiment of the present invention. A touchscreen and a display screen of the electronic device are integrated into a structure of the screen. A screen 200 includes:

a cover plate 201, a display screen 202, and a metal middle frame 203, where the display screen 202 is located between the cover plate 201 and the metal middle frame 203, and the metal middle frame 203 is grounded; and the electronic device 200 further includes:

a conducting layer 204, where the conducting layer 204 is attached to a lower surface 2020 of the display screen 202.

As shown in FIG. 2, it can be understood that, in a perpendicular direction from a top layer of the electronic device to a bottom layer of the electronic device, an upper surface of the display screen is attached to the cover plate, and the conducting layer is attached to the lower surface of the display screen.

Different from the conventional art, a material required by the conducting layer in this embodiment of the present invention is relatively common provided that the material is electrically conductive. Therefore, some existing conducting materials can be effectively utilized, and a dedicated pressure material is not required, thereby reducing material costs to a great extent.

Further, the conducting layer is attached to the lower surface of the display screen.

As shown in FIG. 2, there is at least one gap (a blank portion between the conducting layer and the metal middle frame shown in FIG. 2) between the conducting layer 204 and the metal middle frame 203. The conducting layer 204, the metal middle frame 203, and the at least one gap form at least one capacitor. A capacitance change of the at least one capacitor reflects at least one pressure value applied on the cover plate 201.

It can be understood that, a conducting layer, a metal middle frame, and at least one gap form at least one capacitor. The conducting layer may be considered as one plate of the capacitor, the metal middle frame may be considered as the other plate of the capacitor, and the capacitor may serve as a pressure sensor. For example, a user generates particular force when pressing a cover plate, and an action of the force causes deformation of the conducting layer. As a result, a distance between the two plates of the capacitor changes, and a capacitance of the capacitor changes. Further, a capacitance change of the capacitor may reflect a value of a pressure applied on the cover plate. For example, as a pressure sensor, the capacitor of this structure can sense pressures of 60 thousand orders generated from a light press to a heavy press, thereby recognizing pressures of different orders.

It can be understood that, a capacitance change of the capacitor is directly proportional to a value of the pressure. For example, a larger capacitance change of the capacitor reflects a larger pressure applied on the cover plate, or a larger pressure applied on the cover plate leads to a larger capacitance change of the capacitor.

An application scenario of the technical solutions provided in the embodiments of the present invention is as follows: When a display screen of an electronic device is in a disabled state, some portions of the display screen are lighted by pressing a touchscreen of the electronic device, to display screen display data, and the other portion of the display screen is still in a disabled state.

With reference to the foregoing hardware structure of the electronic device, the technical solutions in the embodiments of the present invention are implemented by using a computer software program. The technical solutions include: when the display screen of the electronic device is in a disabled state, the touchscreen is configured to detect a pressure operation performed by a user on the touchscreen of the electronic device, obtain a pressure value of the pressure operation, and send the pressure value to a processor.

The processor is configured to: after receiving the pressure value, first determine whether the pressure value is greater than or equal to a preset pressure operation threshold; and if the pressure value is greater than or equal to the preset pressure operation threshold, determine to display, in a first portion of the display screen, the screen display data.

Specifically, the processor may directly determine to display preset screen display data according to a preset display attribute (such as a text font, a text color, a display luminance, and a display animation). The processor may alternatively determine to-be-displayed screen display data and a display attribute of the screen display data according to a preset association relationship (such as a data association relationship or a display attribute association relationship) and different pressure operations. For example, the touchscreen detects pressure information of a pressure operation, such as a pressure value and a contact location of the pressure operation, and sends the pressure value of the pressure operation to the processor. The processor determines, according to the pressure value and a preset association relationship, to-be-displayed screen display data corresponding to the pressure value and/or a display attribute corresponding to the pressure value.

After determining the to-be-displayed screen display data and the display attribute, the processor generates a display instruction, and the display instruction is used to instruct the display screen to display, according to the display attribute determined by the processor, the screen display data determined by the processor. After receiving the display instruction, the display screen displays the screen display data according to the display instruction.

Further, if the pressure operation changes (for example, the pressure value changes or the pressure operation is continuously performed on the display screen) or the touchscreen detects a new operation within a preset time period after the pressure operation ends, the touchscreen continues to detect changed operation information, and sends the changed operation information to the processor. The processor determines new to-be-displayed screen display data and a display attribute of the screen display data according to the changed operation information and a preset association relationship (such as a data association relationship or a display attribute association relationship). The processor generates a new display instruction, and instructs the display screen to display the new screen display data according to the new display instruction.

For example, when the pressure value of the pressure operation continues to increase, the processor determines, according to a preset data association relationship, to display more screen display data, and the display screen displays the screen display data according to the instruction of the processor. An effect that can be learnt by the user is: With an increase in the pressure value of the pressure operation performed by the user on the touchscreen, screen display data displayed on the display screen increases.

Words and terms in the following embodiments are described below.

It should be understood that ordinals such as "first" and "second" mentioned in the embodiments of the present invention are merely for differentiation unless they indeed indicate a sequence according to a context. For example, both a "first pressure value" and a "second pressure value" indicate pressure values, but indicate different pressure values respectively.

"A display screen is in a disabled state" mentioned in some embodiments of the present invention indicates that an electronic device is in a standby state but the display screen is in a black screen (or referred to as screen-off) state. When the display screen is fully lighted, a lock-screen interface of the electronic device is displayed, and the electronic device enters into a lock-screen state from a standby state. The lock-screen state indicates that a screen is locked and an unlock interface is provided by displaying preset particular content. A user needs to enter a particular password or perform a particular operation/gesture on the interface, to exit the lock-screen state to enter an unlock state. In an unlock state, the user can normally use various functions of the electronic device.

A "pressure operation" mentioned in some embodiments of the present invention refers to a press operation performed on a touchscreen by a user by using any proper object or accessory such as a finger, a palm, or a stylus with a particular pressure. Further, the pressure operation refers to a press operation that can change a capacitance value of the touchscreen, so as to avoid a tap by mistake that is caused when the touchscreen is pressed by an object having particular hardness. An entity for performing a pressure operation, a quantity of pressure operations, a location, in which a pressure operation is performed, of the touchscreen, and the like are not limited in some embodiments of the present invention. For example, when multiple pressure operations are performed on the touchscreen at the same time, all the pressure operations may be detected at the same time, or any pressure operation may be detected. The touchscreen may detect a pressure operation performed in any location of the touchscreen, or may detect a pressure operation performed in a preset location of the touchscreen. Duration of a pressure operation is changeable. In other words, the user may perform a press operation on the touchscreen with a particular pressure and then stops the press operation (that is, "short tap"), or may continuously perform a press operation (that is, "touch and hold") on the touchscreen with a particular pressure.

A "first pressure value" mentioned in some embodiments of the present invention refers to a pressure value of a pressure operation performed on a touchscreen when a display screen is in a disabled state, where the pressure operation stops being performed on the touchscreen (that is, "short tap") after the display screen is partially lighted; or a "first pressure value" refers to a pressure value of a pressure operation performed on a touchscreen when a display screen is in a disabled state, where the pressure operation continues to be performed on the touchscreen (that is, "touch and hold", where a contact for the pressure operation always keeps in contact with the touchscreen and does not get away from a surface of the touchscreen) after the display screen is partially lighted. For a "touch and hold" pressure operation, after the display screen is partially lighted, a pressure value of the pressure operation is a "second pressure value" mentioned in some embodiments of the present invention. That is, if the pressure operation is performed when the display screen is in a disabled state and continues to be performed after the display screen is partially lighted, a pressure value of the pressure operation that is after the display screen is in a disable state and that is before the display screen is partially lighted is the first pressure value, and a pressure value of the pressure operation that is after the display screen is partially lighted is the second pressure value. Further, the pressure value may refer to a specific pressure value of the pressure operation, or may refer to a meaning similar to a pressure value, for example, a pressure level that reflects a pressure value. Correspondingly, a preset pressure operation threshold may refer to a specific preset threshold of a pressure value, or may refer to a meaning similar to a preset threshold of a pressure value, for example, a preset threshold of a pressure level.

A "first portion" mentioned in some embodiments of the present invention refers to a partial display portion of a display screen. A "second portion" mentioned in some embodiments of the present invention refers to the other display portion of the display screen different from the first portion. The display screen may be a display screen that supports a function of lighting some portions, or may be a display screen that does not support a function of lighting some portions. When the display screen does not support lighting of some portions, an instruction for instructing the second portion to be displayed in black is sent to the display screen, so that the display screen controls to set a background color of the second portion to be black for display, to simulate a disabled state.

"Screen display data" mentioned in some embodiments of the present invention refers to a user interface object corresponding to one or more functions of a device and/or function information that a user may be interested in. The user interface object includes a non-interactive object that constitutes a user interface appearance, an interaction object that may be provided for user interaction, or a combination thereof. The non-interactive object of the user interface appearance includes a background image, a background animation, and the like that constitute the user interface appearance. The non-interactive object may be set by the user, or the device may automatically select an object stored in the device, for example, a background image on a lock-screen interface for a theme currently used by the electronic device. The interaction object that may be provided for user interaction may respond to a user interaction operation, and includes an icon, a virtual function button (such as a photographing function button or an emergency call button), a drop-down list, a sliding module (such as an unlock sliding module), and the like. The function information includes but is not limited to time information, date information, weather information, system information (such as electric power and an operator network signal), and notification information. "First screen display data" mentioned in some embodiments of the present invention refers to screen display data initially displayed when a first portion of a display screen is lighted. When a pressure operation changes, a pressure operation is continuously performed on a touchscreen, or a new operation is performed on a touchscreen within a preset time period, if the screen display data changes, changed screen display data is defined as "second screen display data" in some embodiments of the present invention.

A "display attribute" mentioned in some embodiments of the present invention refers to a display attribute of screen display data and a display attribute of a display screen pixel when the data is being displayed, and includes at least a display luminance. Specifically, when the screen display data includes a text, the display attribute includes a display attribute of the text, for example, a TextView attribute (including text content, a text font size, a text color, a background color, and the like) defined in an Android system. When the screen display data includes an image, the display attribute includes a display attribute of the image, for example, an ImageView attribute (including an image aspect ratio, an image stretching proportion, an image rendering color, and the like) defined in an Android system. When the screen display data includes a control, the display attribute includes a display attribute of the control, and the like. A pixel display parameter of the display screen includes but is not limited to a display luminance and display duration. A "first display attribute" mentioned in some embodiments of the present invention refers to a display attribute when first screen display data is being displayed, and a "second display attribute" refers to a display attribute when second screen display data is being displayed.

A "data association relationship" mentioned in some embodiments of the present invention includes an association relationship between screen display data and information about a pressure operation or information about another operation. Association relationships between screen display data and different information about a pressure operation or information about another operation form different data association relationships. For example, an association relationship between a pressure value and screen display data is a first data association relationship, and an association relationship between a first pressure value, pressure duration, and screen display data is a second data association relationship. After receiving information about a pressure operation, a processor determines, according to the information about the pressure operation and a preset data association relationship, screen display data corresponding to the information about the pressure operation.

There are multiple specific storage forms of data association relationships, including but not limited to a database file and a configuration file. It should be noted that, different data association relationships mentioned in some embodiments of the present invention refer to logic division, and in a specific storage form, different data association relationships may be stored in a same physical file, or may be respectively stored in different physical files. For example, the first data association relationship and the second data association relationship may be stored in a same database file, or may be respectively stored in different database files.

A "display attribute association relationship" mentioned in some embodiments of the present invention includes an association relationship between a display attribute and information about a pressure operation or information about another operation. Association relationships between different display attributes and different of information about a pressure operation or information about another operation form different display attribute association relationships. For example, an association relationship between a pressure value and a display attribute is a first display attribute association relationship, and an association relationship between a pressure value, pressure duration, and a display attribute is a second display attribute association relationship. After receiving information about a pressure operation, a processor determines, according to the information about the pressure operation and a preset display attribute association relationship, a display attribute of screen display data corresponding to the information about the pressure operation.

There are multiple specific storage forms of display attribute association relationships, including but not limited to a database file and a configuration file. It should be noted that, different display attribute association relationships mentioned in some embodiments of the present invention refer to logic division, and in a specific storage form, different display attribute association relationships may be stored in a same physical file. A display attribute association relationship and a data association relationship may be stored in a same physical file, or may be respectively stored in different physical files. For example, the first display attribute association relationship and the second display attribute association relationship may be stored in a same database file, or may be respectively stored in different database files.

The following describes the technical solutions of the present invention in detail by using specific embodiments. The following several specific embodiments can be combined mutually, and same or similar concepts or processes may not be described in some embodiments again.

Figure 3:
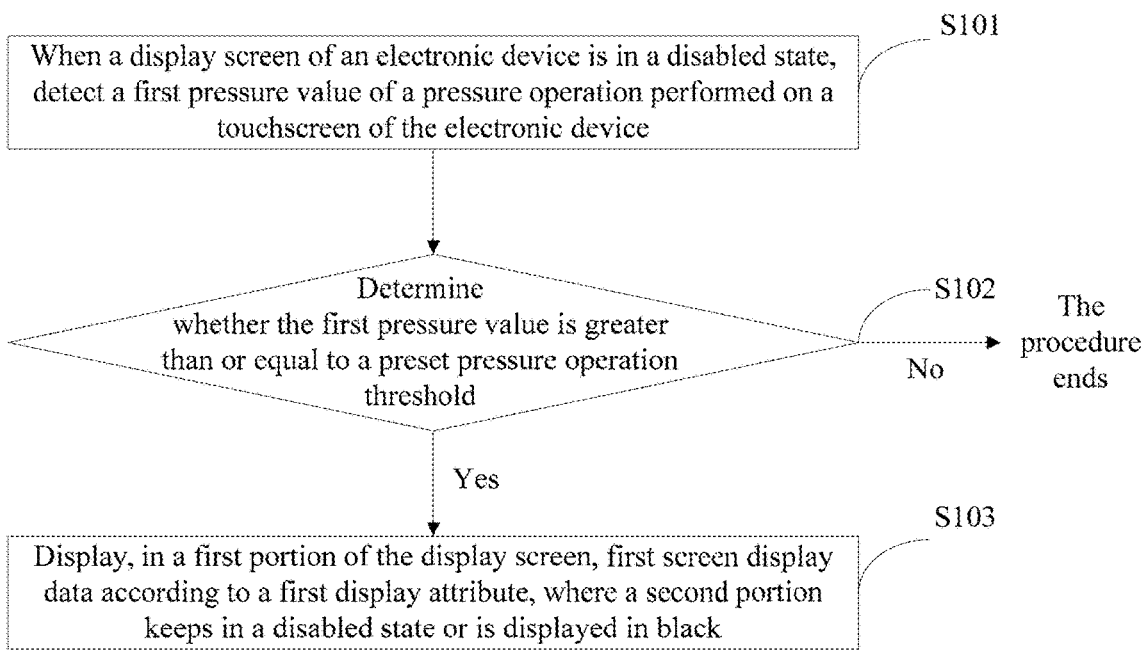
FIG. 3 is a schematic flowchart of a screen enabling method according to an embodiment of the present invention.

FIG. 3 is a schematic flowchart of a screen enabling method according to an embodiment of the present invention. As shown in FIG. 3, FIG. 3 illustrates a process in which a display screen of an electronic device switches from a disabled state to a partially lighted state (that is, a first portion of the display screen is lighted for displaying data, and a second portion keeps in a disabled state). The process may be instant, almost instant, progressive, or at any proper rate. Progress of the process may be automatically controlled by the electronic device, or may be set by a user. Method steps of the process may be performed sequentially or concurrently, or more or fewer method steps may be included. The method procedure includes the following steps:

S101. When a display screen of an electronic device is in a disabled state, detect a first pressure value of a pressure operation performed on a touchscreen of the electronic device.

S102. Determine whether the first pressure value is greater than or equal to a preset pressure operation threshold; and if the first pressure value is greater than or equal to the preset pressure operation threshold, proceed to step S103.

S103. Display, in a first portion of the display screen, first screen display data according to a first display attribute, where a second portion keeps in a disabled state or is displayed in black.

When the display screen of the electronic device is in a disabled state (in this case, the electronic device is in a standby state), a user performs a pressure operation on the touchscreen of the electronic device. The display screen and the touchscreen of the electronic device may be separate components, or may be integrated into a same component.

The touchscreen detects the first pressure value of the pressure operation performed on the touchscreen, where the first pressure value refers to a pressure value of the pressure operation performed on the touchscreen when the display screen of the electronic device is in a disabled state.

Optionally, the first pressure value of the pressure operation performed on a fingerprint portion of the touchscreen of the electronic device is detected, so as to reduce a misoperation.

Optionally, before the detecting a first pressure value of a pressure operation performed on a touchscreen of the electronic device, the method procedure further includes: obtaining fingerprint information of the pressure operation performed on the touchscreen of the electronic device; matching the fingerprint information and a prestored authorized fingerprint image; and if the matching succeeds, detecting the first pressure value of the pressure operation performed on the touchscreen of the electronic device. In this way, unauthorized use of the electronic device is avoided.

The touchscreen sends the detected first pressure value of the pressure operation to a processor, so that the processor determines whether the first pressure value is greater than or equal to the preset pressure operation threshold. The pressure operation threshold may be preset and stored in the electronic device and independent of the user, or may be set by the user.

If the first pressure value is not greater than the preset pressure operation threshold, the processor does not perform processing. All portions of the display screen continue to keep in a disabled state. If the first pressure value is greater than or equal to the preset pressure operation threshold, the processor instructs the display screen to switch from a disabled state to a partially lighted state. Specifically, the processor determines to display, in the first portion of the display screen, the first screen display data according to the first display attribute, and enables the second portion of the display screen to keep in a disabled state or sets a background color of the second portion to be black, to simulate a disabled state. Therefore, power consumption of the electronic device is reduced. The first portion is a partial display portion of the display screen. A specific location of the first portion may be set by the user, or may be preset and stored in the electronic device. For example, the first portion is set as a circular portion whose center of a circle is a center of the display screen and whose radius is R. The first screen display data refers to screen display data initially displayed when the first portion of the display screen is lighted.

Content of the first screen display data may be set by the user, or may be preset and stored in the electronic device. For example, the first screen display data is set as time information and a date. The first display attribute is a display attribute when the first screen display data is being displayed. The first display attribute may be set by the user, or may be preset in the electronic device. For example, the first display attribute is set as: a display luminance is 10%, display duration is 3 seconds, and a display animation is fade-in and fade-out. When the preset display duration expires, the first screen display data in the first portion disappears, that is, the display screen is disabled.

Further, when the first screen display data is displayed in the first portion, if the touchscreen detects that the user is still in contact with the touchscreen after the pressure operation ends, the display duration of the first screen display data is prolonged.

FIG. 4A to FIG. 4D are schematic diagrams illustrated when the display screen of the electronic device is partially lighted.

Figure 4A:
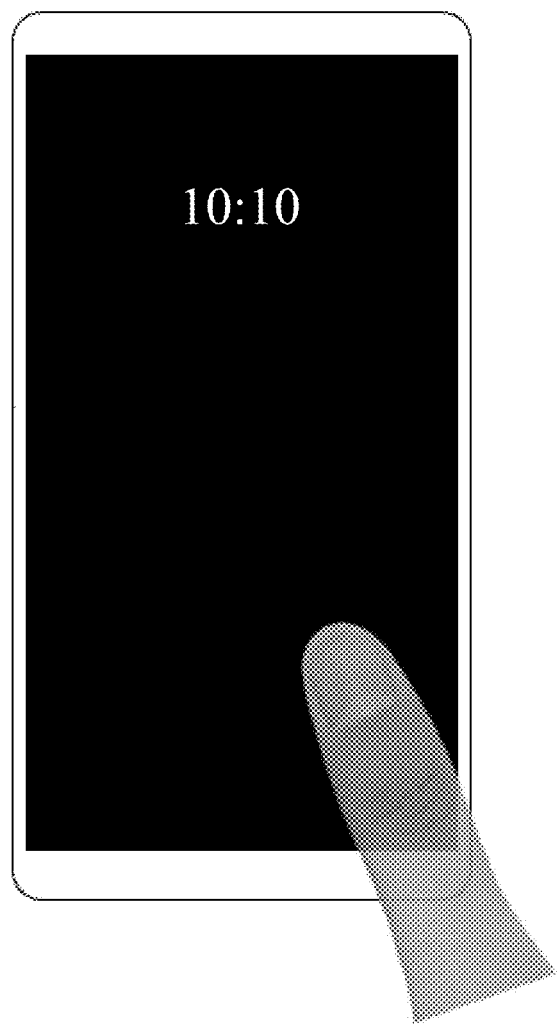
FIG. 4A is a schematic diagram of displaying time information in a first portion of a display screen.

For example, FIG. 4A is a schematic diagram of displaying time information in the first portion of the display screen. As shown in FIG. 4A, in the first portion of the display screen, only the time information is displayed without a background image.

Figure 4B:
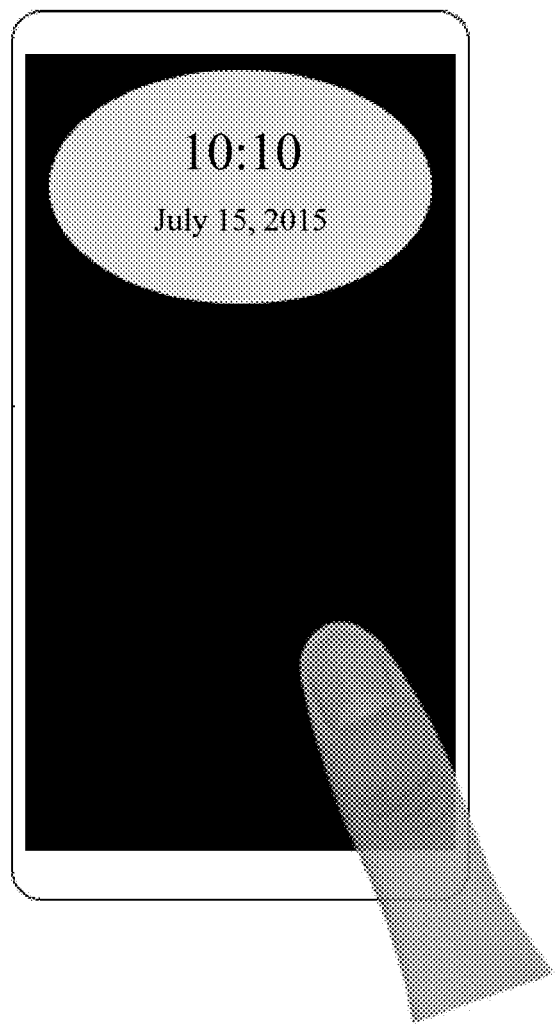
FIG. 4B is a schematic diagram of displaying screen display data on a display screen according to a first display luminance.

For example, FIG. 4B is a schematic diagram of displaying screen display data on the display screen according to a first display luminance. As shown in FIG. 4B, in the first portion of the display screen, time information and date information are displayed with a background image according to the first display luminance, and the first display luminance is 60%.

Optionally, a location of the first portion is associated with a first contact location for the pressure operation. The first contact location is a contact location, for the pressure operation, corresponding to a time when the first pressure value of the pressure operation performed on the touchscreen is greater than or equal to the preset pressure operation threshold in a case in which the display screen is in a disabled state. Before the displaying first screen display data, the method further includes:

obtaining the first contact location of the touchscreen, in which the pressure operation is performed, corresponding to a time when the first pressure value is greater than or equal to the preset pressure operation threshold; and determining the location, associated with the first contact location, of the first portion according to the first contact location.

Specifically, the location of the first portion is coordinates of a pixel in the first portion.

In an example, manners for determining the first portion include but are not limited to the following manners:

1. After the first contact location for the pressure operation is obtained, the coordinates of the pixel in the first portion are determined according to corresponding coordinates, on the touchscreen, of the first contact location A. Some pixels in the first portion overlap with A, so that a location is lighted when the user presses the location.

Figure 4C:
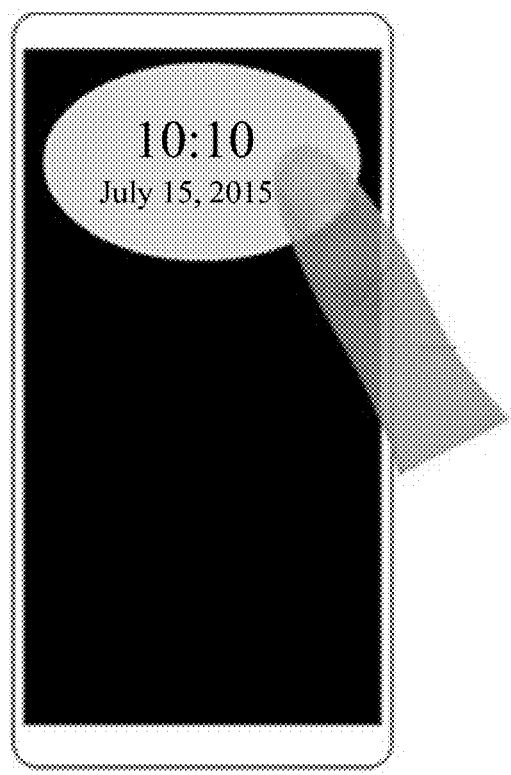
FIG. 4C is a schematic diagram illustrated when a first portion of a display screen is associated with a first contact location.

FIG. 4C is a schematic diagram illustrated when the first portion of the display screen is associated with the first contact location. The user presses the first contact location A of the touchscreen by using a finger. The touchscreen detects that the first contact location is A, and determines the coordinates of the pixel in the first portion according to the coordinate location of A. That is, the user presses the location A by using a finger, and then a radiation portion of A is lighted.

2. In the electronic device, at least two locations are preset for the first portion; after the first contact location for the pressure operation is obtained, it is determined whether the first contact location overlaps with one of the locations preset for the first portion; and if the first contact location overlaps with one of the locations preset for the first portion, it is determined that the other preset location is used as the location of the first portion.

3. In the electronic device, a location is preset for the first portion; after the first contact location for the pressure operation is obtained, it is determined whether the first contact location overlaps with the location preset for the first portion; and if the first contact location overlaps with the location preset for the first portion, the location of the first portion is set again according to a preset condition. In this way, it is avoided that a location in which a user's finger performs a pressure operation exactly covers the first portion for displaying the first screen display data.

4. After the first contact location for the pressure operation is obtained, coordinates of a boundary pixel of the first portion are determined according to corresponding coordinates, on the touchscreen, of the first contact location A. The first screen display data is displayed near a contact for the pressure operation, so that after the user presses a location, a portion near the location is lighted, thereby improving intelligence of human-machine interaction.

Optionally, a portion, in which A is located, of the touchscreen is determined according to the corresponding coordinates, on the touchscreen, of the first contact location A. For example, it is determined whether A is close to an upper frame, a lower frame, a left frame, or a right frame of the touchscreen. If A is close to the upper frame of the touchscreen, it is determined that the first portion is a display portion of a preset size below A. If A is close to the lower frame of the touchscreen, it is determined that the first portion is a display portion of a preset size above A. If A is close to the left frame of the touchscreen, it is determined that the first portion is a display portion of a preset size on the right of A. If A is close to the right frame of the touchscreen, it is determined that the first portion is a display portion of a preset size on the left of A.

Optionally, an area of the first portion is determined according to the first pressure value and a first display portion association relationship. The first portion association relationship includes an association relationship between the pressure value and the area of the first portion. That is, different first pressure values are corresponding to different sizes of the first portion. Optionally, a larger first pressure value is corresponding to a larger area of the first portion.

Specifically, the area of the first portion may be represented by using a quantity of pixels in the first portion.

For example, when the first pressure value included in the first display portion association relationship is 5 N (newton), the area of the first portion is 1 centimeter; and when the first pressure value is 8 N, the area of the first portion is 2 centimeters. Therefore, when it is detected that the first pressure value of the pressure operation is 5 N, the screen display data is displayed in the first portion whose area is 1 centimeter; and when it is detected that the first pressure value of the pressure operation is 8 N, the screen display data is displayed in the first portion whose area is 2 centimeters.

In this embodiment of the present invention, when a display screen of an electronic device is in a disabled state, a first pressure value of a pressure operation performed on a touchscreen is obtained; and when the first pressure value is greater than or equal to a preset pressure operation threshold, the display screen is partially lighted to display screen display data. The display screen is partially lighted by pressing the touchscreen, so that a user can view information of interest without fully lighting the display screen, thereby reducing power consumption caused by display in full screen, and improving intelligence of human-machine interaction.

Optionally, based on the method procedure shown in FIG. 3, the method further includes: determining the first screen display data and/or the first display attribute according to the first pressure value of the pressure operation. When the display screen of the electronic device is in a disabled state, if the user applies different pressures (a pressure value is not less than the preset pressure operation threshold) on the touchscreen, different content and/or different effects are displayed when the display screen is lighted. The method procedure further includes:

determining the first screen display data according to the first pressure value and a preset first data association relationship; and/or determining the first display attribute according to the first pressure value and a preset first display attribute association relationship.

Specifically, the first data association relationship and/or the first display attribute association relationship are/is preset and stored in the electronic device. The first data association relationship includes an association relationship between the pressure value and the screen display data, and the first display attribute association relationship includes an association relationship between the pressure value and the display attribute. In an example, the first data association relationship and the first display attribute association relationship are respectively listed in the following Table 1 and Table 2. Screen display data included in the first data association relationship is not limited to content listed in Table 1, and a display attribute field included in the first display attribute association relationship is not limited to content listed in Table 2.

TABLE 1

| Pressure value | Screen display data |
|---|---|
| 5 N to 7 N | Time |
| 8 N to 9 N | Time and date |
| 10 N to 12 N | Time, date, and weather |

According to Table 1, when the first pressure value is 5 N (the preset pressure operation threshold is 5 N), the display screen is partially lighted, and time information is displayed in the first portion; when the first pressure value is 8 N, time information and date information are displayed in the first portion; and when the first pressure value is 10 N, time information, date information, and weather information are displayed in the first portion.

TABLE 2

| Pressure value | Display attribute |
|---|---|
| 5 N to 7 N | Display luminance: 10%, display duration: 1 second, and text color: white |
| 8 N to 9 N | Display luminance: 30%, display duration: 2 seconds, and text color: white |
| 10 N to 12 N | Display luminance: 60%, display duration: 3 seconds, and text color: white |

According to Table 2, when the first pressure value is 5 N (the preset pressure operation threshold is 5 N), the display screen is partially lighted, and for the first screen display data in the first portion, the display luminance is 10%, and the display duration is 1 second; when the first pressure value is 8 N, for the first screen display data in the first portion, the display luminance is 30%, and the display duration is 2 seconds; and when the first pressure value is 10 N, for the first screen display data in the first portion, the display luminance is 60%, and the display duration is 3 seconds. In these three cases, all text colors are white.

The first pressure value may have an association relationship with both the first screen display data and the first display attribute, or may have an association relationship with either the first screen display data or the first display attribute. In other words, three cases are listed as follows:

1. First screen display data (that is, the first screen display data is unrelated to the first pressure value) is preset, a first display attribute is determined according to the first pressure value and the first display attribute association relationship, and the preset first screen display data is displayed in the first portion of the display screen according to the determined first display attribute.

2. A first display attribute (that is, the first display attribute is unrelated to the first pressure value) is preset, first screen display data is determined according to the first pressure value and the first data association relationship, and the determined first screen display data is displayed in the first portion of the display screen according to the preset first display attribute.

3. A first display attribute is determined according to the first pressure value and the first display attribute association relationship, first screen display data is determined according to the first pressure value and the first data association relationship, and the determined first screen display data is displayed in the first portion of the display screen according to the determined first display attribute.

Figure 4D:
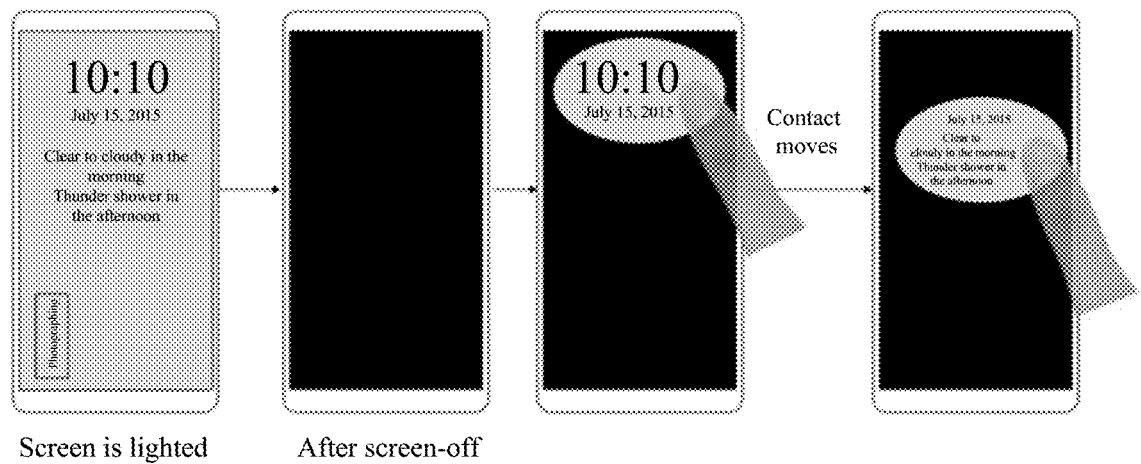
FIG. 4D is a schematic diagram of displaying different screen display data on a display screen according to movement of a contact location.

Optionally, in the method procedure shown in FIG. 3, when the pressure operation is continuously performed on the touchscreen and a contact for the pressure operation moves, the first portion moves according to a contact location for the pressure operation. FIG. 4D is a schematic diagram of displaying different screen display data on a display screen according to movement of a contact location. As shown in FIG. 4D, when the display screen of the electronic device is in a disabled state, the location of the first portion is determined according to the contact location; and when the display screen is lighted, screen display data, corresponding to the location of the first portion, on a lock-screen theme interface is displayed in the first portion. Step S103 in the method procedure includes:

obtaining the first contact location of the touchscreen, in which the pressure operation is performed, corresponding to a time when the first pressure value is greater than or equal to the preset pressure operation threshold;

determining the first location, associated with the first contact location, of the first portion according to the first contact location;

determining the first screen display data according to the first location of the first portion and the preset lock-screen theme interface, where the first screen display data is screen display data, corresponding to the first location of the first portion, on the lock-screen theme interface; and displaying, in the first location of the first portion of the display screen, the first screen display data.

Further, the method procedure includes: when the contact moves in a process in which the pressure operation is continuously performed on the touchscreen, obtaining a second contact location corresponding to a time when movement of the contact for the pressure operation stops;

determining a second location, associated with the second contact location, of the first portion according to the second contact location;

determining the second screen display data according to the second location of the first portion and the preset lock-screen theme interface, where the second screen display data is screen display data, corresponding to the second location of the first portion, on the lock-screen theme interface; and displaying, in the second location of the first portion of the display screen, the second screen display data.

Further, when the second screen display data is being displayed in the second location of the first portion of the display screen, the first screen display data may stop being displayed or may continue to be displayed in the first location of the first portion.

Further, if the touchscreen detects that the user performs a drag operation on a boundary of the first portion, the first portion is scaled up or scaled down according to a direction of the drag operation. For example, if the first portion is a square portion, and the user touches and drags a lower boundary of the first portion, according to the direction of the drag operation, the lower boundary of the first portion is dragged to a contact location in which the drag operation stops.

In this embodiment of the present invention, when a display screen of an electronic device is in a disabled state, a first pressure value of a pressure operation performed on a touchscreen is obtained; and when the first pressure value is greater than or equal to a preset pressure operation threshold, the display screen is partially lighted to display screen display data. The display screen is partially lighted by pressing the touchscreen, so that a user can view information of interest without fully lighting the display screen, and operate conveniently, thereby reducing power consumption caused by display in full screen.

Figure 5:
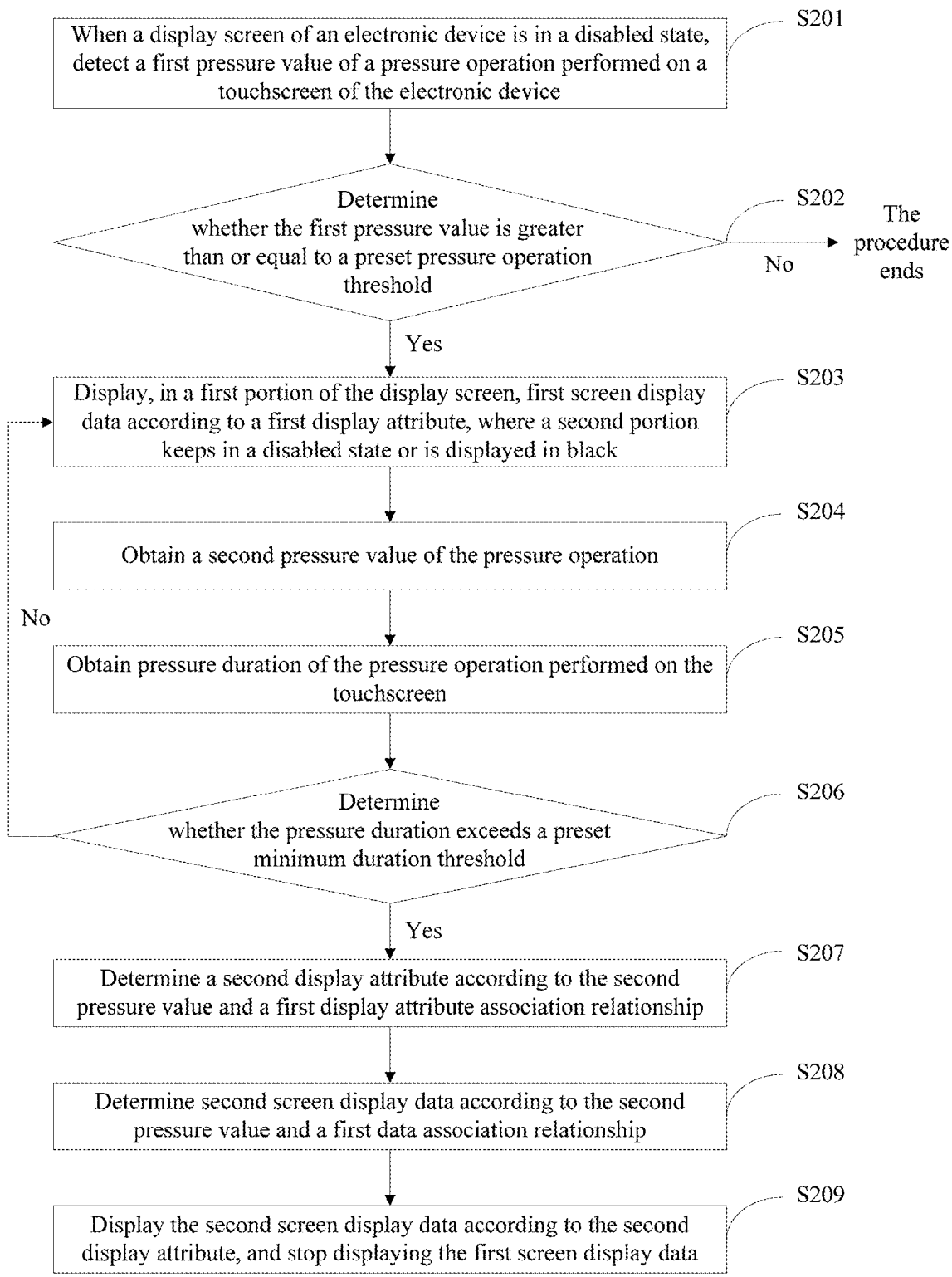
FIG. 5 is a schematic flowchart of another screen enabling method according to an embodiment of the present invention.

FIG. 5 is a schematic flowchart of another screen enabling method according to an embodiment of the present invention. As shown in FIG. 5, FIG. 5 illustrates a process in which a display screen of an electronic device switches from a disabled state to a partially lighted state (that is, a first portion of the display screen is lighted for displaying data, and a second portion keeps in a disabled state). Based on the foregoing embodiment of the method procedure, the method procedure in FIG. 5 further includes: after the display screen is partially lighted, continuously performing a pressure operation on a touchscreen (that is, touching and holding the touchscreen); and differentially displaying screen display data and/or a display attribute according to a second pressure value of the pressure operation.

When the display screen of the electronic device is in a disabled state, a user performs a pressure operation on the touchscreen of the electronic device, where a pressure value of the pressure operation is greater than a preset pressure operation threshold. The display screen switches from a disabled state to a partially lighted state, and first screen display data is displayed in the first portion of the display screen according to a first display attribute, where the second portion keeps in a disabled state or is displayed in black.

After the display screen is partially lighted, if the pressure operation is continuously performed on the touchscreen (no interruption occurs on the pressure operation), but the pressure value changes, the screen display data on the display screen or the display attribute of the screen display data changes accordingly. For example, if the pressure value of the pressure operation performed by the user on the touchscreen increases, content displayed on the display screen also increases and/or a display luminance also increases. In contrast, if the pressure value of the pressure operation performed by the user on the touchscreen decreases, content displayed on the display screen also decreases and/or a display luminance also decreases.

Method steps in FIG. 5 may be performed sequentially or concurrently, or more or fewer method steps may be included. The method procedure includes the following steps:

S201. When a display screen of an electronic device is in a disabled state, detect a first pressure value of a pressure operation performed on a touchscreen of the electronic device.

S202. Determine whether the first pressure value is greater than or equal to a preset pressure operation threshold; and if the first pressure value is greater than or equal to the preset pressure operation threshold, proceed to step S203.

S203. Display, in a first portion of the display screen, first screen display data according to a first display attribute, where a second portion keeps in a disabled state or is displayed in black.

S204. Obtain a second pressure value of the pressure operation.

S205. Obtain pressure duration of the pressure operation performed on the touchscreen.

S206. Determine whether the pressure duration exceeds a preset minimum duration threshold; and if the pressure duration exceeds the preset minimum duration threshold, proceed to step S207.

S207. Determine a second display attribute according to the second pressure value and a first display attribute association relationship.

The first display attribute association relationship includes an association relationship between the pressure value and the display attribute.

S208. Determine second screen display data according to the second pressure value and a first data association relationship.

The first data association relationship includes an association relationship between the pressure value and the screen display data.

S209. Display the second screen display data according to the second display attribute, and stop displaying the first screen display data.

The method procedure from step S201 to step S203 is basically the same as the method procedure for the corresponding steps in the foregoing embodiment, and details are not described herein again.

After the display screen is partially lighted, when the pressure operation is continuously performed (that is, "touch and hold") on the touchscreen, the second pressure value of the pressure operation is detected, that is, a pressure value, corresponding to a time after the display screen is partially lighted, of the pressure operation is detected. The second display attribute is determined according to the second pressure value and the preset first display attribute association relationship. The second screen display data is determined according to the second pressure value and the preset first data association relationship.

Figure 6A:
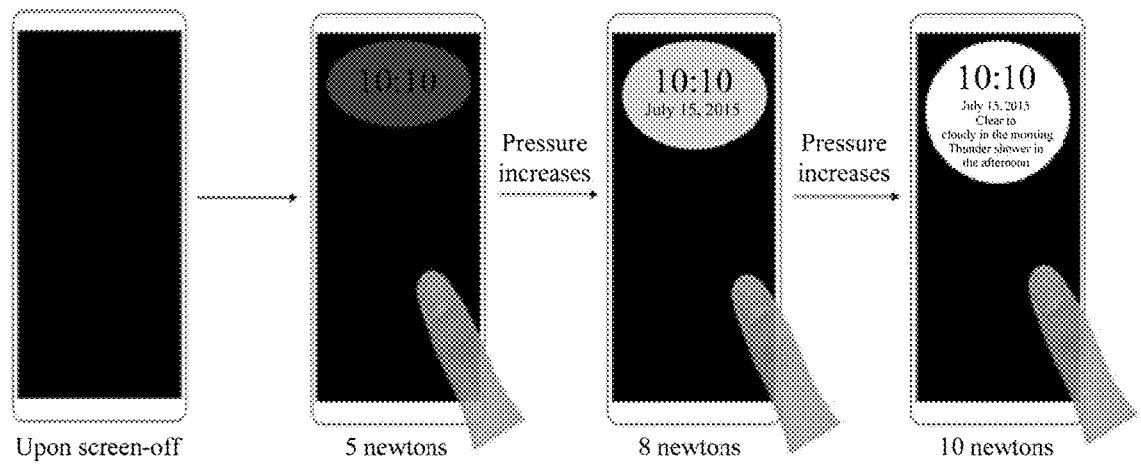
FIG. 6A is a schematic diagram of a display change after a display screen in FIG. 5 is partially lighted.

For example, FIG. 6A is a schematic diagram of a display change after the display screen in FIG. 5 is partially lighted. As shown in FIG. 6A, according to Table 1 and Table 2, when the first pressure value of the pressure operation is 5 N, the first screen display data is time information, and the first display attribute is a display luminance 10% (for ease of description, the following uses only a display luminance as a typical attribute in display attributes, and it can be learnt that another display attribute is further included, and a change principle of the another display attribute is the same as that of the display luminance). After the first portion is lighted, the pressure operation continues to be performed on the touchscreen. Within a preset time period, when it is detected that the second pressure value of the pressure operation increases to 8 N, according to the first data association relationship displayed in Table 1, the second screen display data corresponding to the second pressure value is time information and date information; and according to the first display attribute association relationship displayed in Table 2, the second display attribute corresponding to the second pressure value is a display luminance 30%. When the second pressure value of the pressure operation continues to increase to 10 N, according to the first data association relationship displayed in Table 1, the second screen display data corresponding to the second pressure value is time information, date information, and weather information; and according to the first display attribute association relationship displayed in Table 2, the second display attribute corresponding to the second pressure value is a display luminance 60%. Therefore, the user can learn that, with a continuous increase of the pressure applied on the touchscreen, information displayed on the display screen gradually increases, and a display luminance gradually increases.

In contrast, when the first pressure value of the pressure operation is 8 N, the first screen display data is time information and date information, and a display luminance of the first screen display data is 30%. After the first portion is lighted, the pressure operation continues to be performed on the touchscreen. Within a preset time period, when it is detected that the second pressure value of the pressure operation decreases to 5 N, the second screen display data displayed on the display screen is time information, and a second display luminance is 10%.

It should be noted that, if the pressure operation stops being performed on the touchscreen (that is, "short tap") after the display screen is partially lighted, the first screen display data is displayed on the display screen according to the first display attribute.

Further, if the pressure operation is continuously performed on the touchscreen, the second pressure value of the pressure operation is obtained at a regular interval, and the second display attribute and/or the second screen display data are/is determined according to the second pressure value. In other words, after the display screen is partially lighted, the user continues to perform the pressure operation on the touchscreen. If the second pressure value of the pressure operation changes constantly, as the second pressure value changes, different screen display data is displayed on the display screen and/or a display attribute of screen display data is adjusted.

For example, when the first pressure value of the pressure operation performed by the user on the touchscreen is 5 N, the display screen is partially lighted, the displayed first screen display data is time information, and the display luminance is 10%; when the second pressure value increases to 8 N, the second screen display data displayed on the display screen is time information and date information, and the display luminance is 30%; and when the second pressure value decreases to 5 N, the second screen display data displayed on the display screen is time information, and the display luminance is 10%.

Optionally, a maximum pressure threshold is preset. When the second pressure value of the pressure operation increases to the preset maximum pressure threshold, the display screen is fully lighted, and a lock-screen interface is displayed.

Optionally, an area of the first portion is determined according to the second pressure value and a preset first display portion association relationship. The first portion association relationship includes an association relationship between the pressure value and the area of the first portion. Different pressure values are corresponding to different areas of the first portion. For example, when the pressure value increases, the portion area of the first portion increases. In contrast, when the pressure value decreases, the portion area of the first portion decreases.

Optionally, in the method procedure in FIG. 5, only step S205 or step S206 may be performed.

Figure 6B:
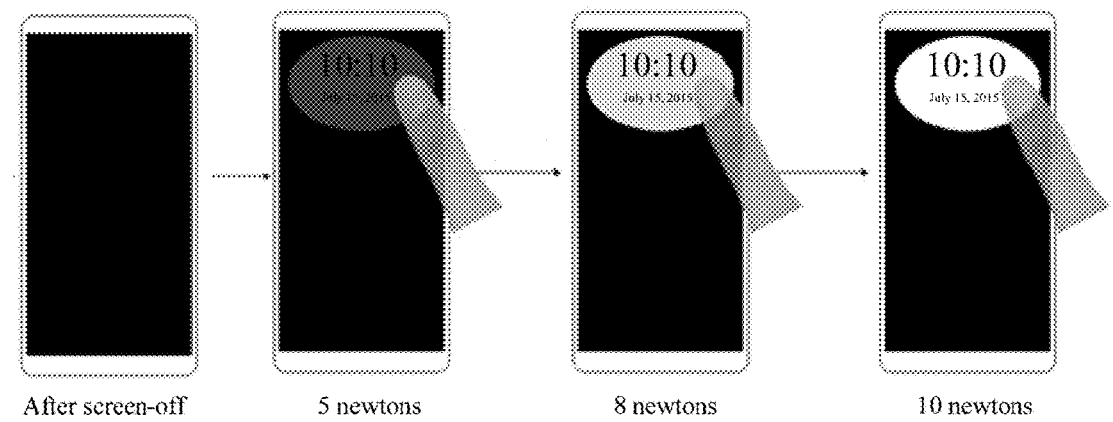
FIG. 6B is a schematic diagram of another display change after a display screen in FIG. 5 is partially lighted.

FIG. 6B is a schematic diagram of another display change after the display screen in FIG. 5 is partially lighted. As shown in FIG. 6B, when only step S205 is performed, the second display attribute is determined only according to the second pressure value and the first display attribute association relationship. Step S207 includes: displaying the first screen display data according to the second display attribute. In this case, the screen display data on the display screen is the first screen display data all the time, but the display attribute changes from the first display attribute to the second display attribute. For example, according to Table 2, when the pressure value of the pressure operation performed by the user on the touchscreen increases from 5 N to 8 N, the screen display data is time information all the time, but the display attribute changes from a luminance 10% to a luminance 30%. That is, with a continuous increase of the pressure applied by the user on the touchscreen, the screen display data displayed on the display screen keeps unchanged, but the display luminance of the screen display data gradually increases.

Figure 6C:
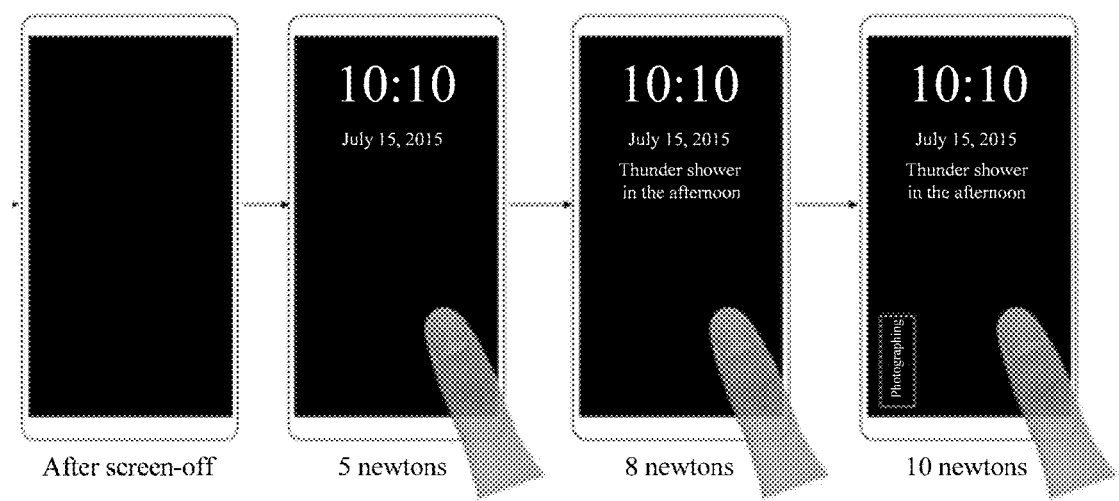
FIG. 6C is a schematic diagram of another display change after a display screen in FIG. 5 is partially lighted.

FIG. 6C is a schematic diagram of another display change after the display screen in FIG. 5 is partially lighted. As shown in FIG. 6C, when only step S206 is performed, the second screen display data is determined only according to the second pressure value and the first data association relationship. Step S207 includes: displaying the second screen display data according to the first display attribute. In this case, the display attribute of the screen display data on the display screen is the first display attribute all the time, but the screen display data changes from the first screen display data to the second screen display data. For example, according to Table 1, when the pressure value of the pressure operation performed by the user on the touchscreen increases from 5 N to 8 N, the display attribute of the screen display data is a luminance 10% all the time, but the screen display data changes from time information to time information and date information. That is, with a continuous increase of the pressure applied by the user on the touchscreen, the screen display data displayed on the display screen increases, but the display attribute of the screen display data keeps unchanged.

In this embodiment of the present invention, when a display screen of an electronic device is in a disabled state, a first pressure value of a pressure operation performed on a touchscreen is obtained; and when the first pressure value is greater than or equal to a preset pressure operation threshold, the display screen is partially lighted to display screen display data. If the pressure operation continues to be performed on the touchscreen after the display screen is partially lighted, screen display data and/or a display attribute are/is determined according to a second pressure value of the pressure operation. The display screen is partially lighted by pressing the touchscreen, so that a user can view information of interest without fully lighting the display screen, thereby reducing power consumption caused by display in full screen. In addition, when the pressure operation is continuously performed on the touchscreen, the screen display data and/or the display attribute of the screen display data vary/varies with the pressure value of the pressure operation, thereby improving intelligence of human-machine interaction.

FIG. 7 is a schematic flowchart of another screen enabling method according to an embodiment of the present invention. As shown in FIG. 7, FIG. 7 illustrates a process in which a display screen of an electronic device switches from a disabled state to a partially lighted state (that is, a first portion of the display screen is lighted for displaying data, and a second portion keeps in a disabled state). Based on the foregoing method procedure, the method procedure in FIG. 7 further includes: after the display screen is partially lighted, continuously performing a pressure operation on a touchscreen (that is, touching and holding the touchscreen); and determining changes/a change of screen display data and/or a display attribute according to duration of the pressure operation.

In other words, when the display screen of the electronic device is in a disabled state, a user performs a pressure operation on the touchscreen of the electronic device, where a pressure value of the pressure operation is greater than a preset pressure operation threshold. The display screen switches from a disabled state to a partially lighted state, and first screen display data is displayed in the first portion of the display screen according to a first display attribute, where the second portion keeps in a disabled state or is displayed in black. After the display screen is partially lighted, if the touchscreen is touched and held, as the pressure duration of the pressure operation performed on the touchscreen increases, the screen display data on the display screen or the display attribute of the screen display data changes accordingly. For example, if the pressure duration of the pressure operation performed by the user on the touchscreen increases, the screen display data on the display screen increases and/or a display luminance of the screen display data increases.

Method steps in FIG. 7 may be performed sequentially or concurrently, or more or fewer method steps may be included. The method procedure includes the following steps:

S301. When a display screen of an electronic device is in a disabled state, detect a first pressure value of a pressure operation performed on a touchscreen of the electronic device.

S302. Determine whether the first pressure value is greater than or equal to a preset pressure operation threshold; and if the first pressure value is greater than or equal to the preset pressure operation threshold, proceed to step S303.

S303. Display, in a first portion of the display screen, first screen display data according to a first display attribute, where a second portion keeps in a disabled state or is displayed in black.

S304. Obtain pressure duration of the pressure operation.

A second pressure value of the pressure operation may change or may not change. The second pressure value of the pressure operation is not limited in this embodiment.

S305. Determine whether the pressure duration exceeds a preset minimum duration threshold; and if the pressure duration exceeds the preset minimum duration threshold, proceed to step S306; otherwise, go back to step S303.

S306. Determine second screen display data according to the first pressure value, the pressure duration, and a second data association relationship.

S307. Determine a second display attribute according to the first pressure value, the pressure duration, and a second display attribute association relationship.

S308. Display, in the first portion of the display screen, the second screen display data according to the second display attribute, and stop displaying the first screen display data.

The method procedure from step S301 to step S303 is basically the same as the method procedure for the corresponding steps in the foregoing embodiment, and details are not described herein again.

Specifically, the pressure duration of the pressure operation is obtained. When the pressure duration is less than the preset minimum duration threshold, it is determined that the pressure operation stops being performed on the touchscreen after the display screen is partially lighted. In this case, the first screen display data is displayed in the first portion of the display screen according to the first display attribute. When the pressure duration is greater than or equal to the preset minimum duration threshold, it is determined that the pressure operation is still performed on the touchscreen after the display screen is partially lighted. Changes/a change of screen display data on the display screen and/or a display attribute of screen display data are/is determined according to the pressure duration.

Specifically, the second data association relationship and/or the second display attribute association relationship are/is preset and stored in the electronic device. The second data association relationship includes an association relationship between the first pressure value, the pressure duration, and the screen display data, and the second display attribute association relationship includes an association relationship between the first pressure value, the pressure duration, and the display attribute. In an example, the second data association relationship and the second display attribute association relationship are respectively listed in the following Table 3 and Table 4. Screen display data included in the second data association relationship is not limited to content listed in Table 3, and a display attribute field included in the second display attribute association relationship is not limited to content listed in Table 4.

TABLE 3

(Second data association relationship)

| First pressure value | Pressure duration | | |
|---|---|---|---|
| | 2 s (second) | 3 s | 4 s |
| 5 N to 7 N | Time | Time and date | Time, date, and weather |
| 8 N to 9 N | Time and date | Time, date, and weather | Time, date, weather, and photographing button |
| 10 N to 12 N | Time, date, and weather | Time, date, weather, and photographing button | A lock-screen interface is displayed in full screen |

TABLE 4

(Second display attribute association relationship)

| First pressure value | Pressure duration | | |
|---|---|---|---|
| | 2 s (second) | 3 s | 4 s |
| 5 N to 7 N | Luminance 10% | Luminance 20% | Luminance 30% |
| 8 N to 9 N | Luminance 30% | Luminance 50% | Luminance 70% |
| 10 N to 12 | Luminance 60% | Luminance 90% | Lighted in full screen |

Figure 8:
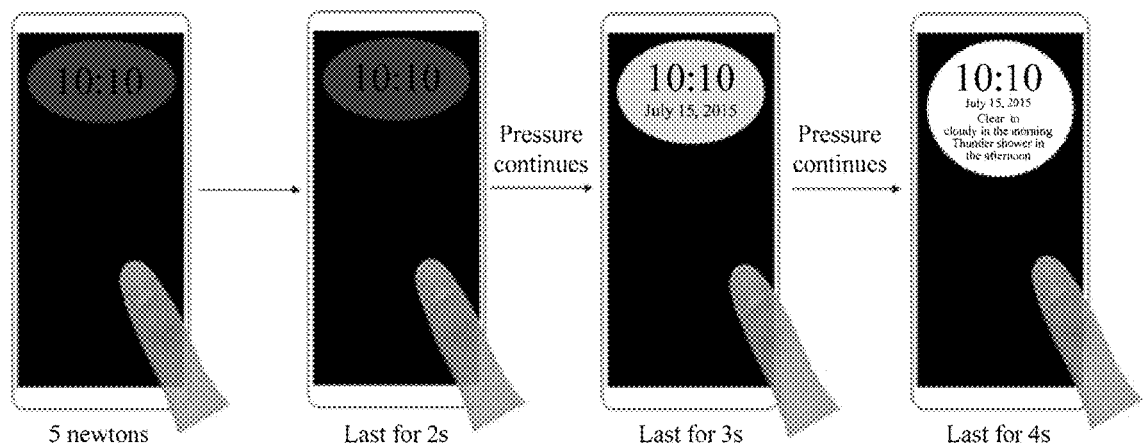
FIG. 8 is a schematic diagram of a display change after a display screen in FIG. 7 is partially lighted.

For example, FIG. 8 is a schematic diagram of a display change after the display screen in FIG. 7 is partially lighted. As shown in FIG. 8, assuming that the first pressure value of the pressure operation is 5 N, the first screen display data is time information and date information, and the first display attribute is a display luminance 10%. After the first portion is lighted, the pressure operation continues to be performed on the touchscreen. According to Table 3 and Table 4, when it is detected that the pressure duration of the pressure operation is 2 s, the screen display data and the display attribute of the screen display data do not change;

when it is detected that the pressure duration of the pressure operation is 3 s, it is determined that the second screen display data is time and a date, and the second display attribute is a display luminance 20%; and when it is detected that the pressure duration of the pressure operation is 4 s, it is determined that the second screen display data is time information, date information, and weather information, and the second display attribute is a display luminance 30%. Therefore, the user can learn that, when the pressure operation is continuously performed on the touchscreen, the screen display data increases, and the display luminance of the screen display data increases.

Optionally, for different first pressure values, when a pressure operation whose first pressure value is larger is continuously performed on the touchscreen, corresponding second screen display data increases faster, and/or a corresponding second display attribute changes faster. For example, when the first pressure value is 5 N, the first display attribute of the first screen display data corresponding to the first pressure value is a luminance 10%; and when the pressure operation lasts for 3 s, the second display attribute is a luminance 20%. That is, in a pressure process of 3 s, the luminance of the screen display data increases by 10%. When the first pressure value is 8 N, the first display attribute of the first screen display data corresponding to the first pressure value is a luminance 30%; and when the pressure operation lasts for 3 s, the second display attribute is a luminance 50%. That is, in a pressure process of 3 s, the luminance of the screen display data increases by 20%. The user can learn that, when larger force is continuously applied on the touchscreen, the screen display data changes faster, so as to improve intelligence of human-machine interaction.

Optionally, a maximum duration threshold is preset. When the pressure duration of the pressure operation increases to the maximum duration threshold, the display screen is fully lighted, and a lock-screen interface is displayed.

Optionally, an area of the first portion is determined according to the first pressure value, the pressure duration, and a preset second display portion association relationship. The second display portion association relationship includes an association relationship between the first pressure value, the pressure duration, and the area of the first portion. For example, with an increase of the pressure duration, the area of the first portion increases. That is, if the user continuously performs a pressure operation on the touchscreen, the area of the first portion gradually increases as the duration increases.

Optionally, in the method procedure in FIG. 7, only step S306 or step S307 may be performed.

When only step S306 is performed, step S308 includes: displaying, in the first portion of the display screen, the second screen display data according to the first display attribute. That is, the user can learn that, when the pressure operation is continuously performed on the touchscreen, the screen display data increases, and the display luminance of the screen display data keeps unchanged.

When only step S307 is performed, step S308 includes: displaying, in the first portion of the display screen, the first screen display data according to the second display attribute. That is, the user can learn that, when the pressure operation is continuously performed on the touchscreen, the screen display data keeps unchanged, and the display luminance of the screen display data increases.

In this embodiment of the present invention, when a display screen of an electronic device is in a disabled state, a first pressure value of a pressure operation performed on a touchscreen is obtained; and when the first pressure value is greater than or equal to a preset pressure operation threshold, the display screen is partially lighted to display screen display data. If the pressure operation continues to be performed on the touchscreen after the display screen is partially lighted, screen display data and/or a display attribute are/is determined according to pressure duration of the pressure operation. The display screen is partially lighted by pressing the touchscreen, so that a user can view information of interest without fully lighting the display screen, thereby reducing power consumption caused by display in full screen. In addition, when the pressure operation is continuously performed on the touchscreen, the screen display data and/or the display attribute of the screen display data increase/increases as the duration of the pressure operation increases, so that more information of interest is displayed for the user, thereby improving intelligence of human-machine interaction.

Figure 9:
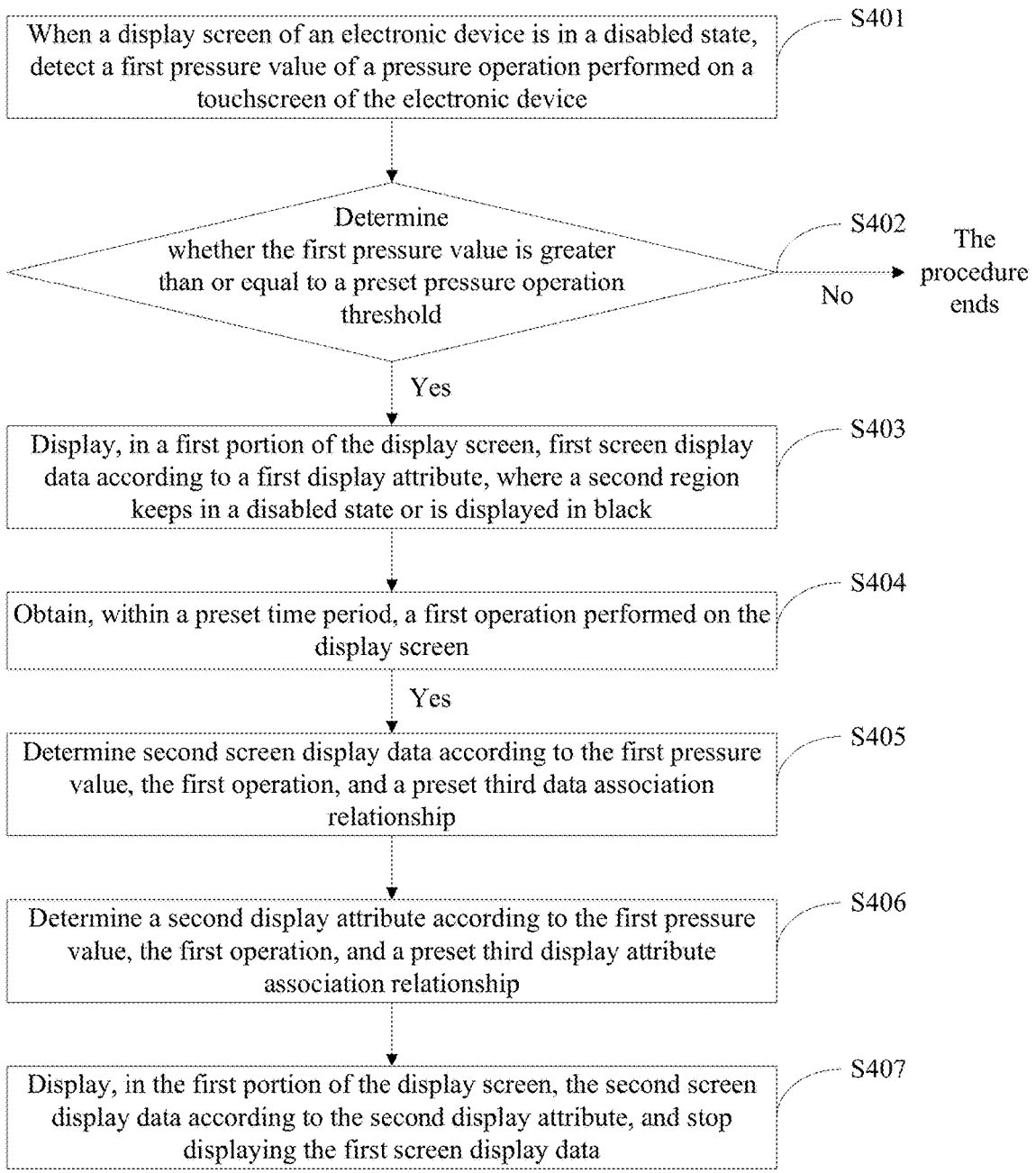
FIG. 9 is a schematic flowchart of another screen enabling method according to an embodiment of the present invention.

FIG. 9 is a schematic flowchart of another screen enabling method according to an embodiment of the present invention. As shown in FIG. 9, based on the foregoing method procedure, the method procedure in FIG. 9 further includes: after a display screen is partially lighted, within a preset time period, if a touchscreen detects that a user performs a first operation on the touchscreen, determining changes/a change of screen display data and/or a display attribute according to the first operation.

In other words, when the display screen of the electronic device is in a disabled state, the user performs a pressure operation on the touchscreen of the electronic device, where a pressure value of the pressure operation is greater than a preset pressure operation threshold. The display screen switches from a disabled state to a partially lighted state, and first screen display data is displayed in a first portion of the display screen according to a first display attribute, where a second portion keeps in a disabled state or is displayed in black. After the display screen is partially lighted, the user ends the pressure operation, but performs the first operation on the touchscreen within the preset time period. In this case, the screen display data on the display screen or the display attribute of the screen display data correspondingly changes according to the first operation. For example, after the user performs a slide touch operation on the touchscreen, the screen display data increases and/or a display luminance of the screen display data increases.

Method steps in FIG. 9 may be performed sequentially or concurrently, or more or fewer method steps may be included. The method procedure includes the following steps:

S401. When a display screen of an electronic device is in a disabled state, detect a first pressure value of a pressure operation performed on a touchscreen of the electronic device.

S402. Determine whether the first pressure value is greater than or equal to a preset pressure operation threshold; and if the first pressure value is greater than or equal to the preset pressure operation threshold, proceed to step S403.

S403. Display, in a first portion of the display screen, first screen display data according to a first display attribute, where a second portion keeps in a disabled state or is displayed in black.

The method procedure from step S401 to Step S403 is basically the same as the method procedure for the corresponding steps in the foregoing embodiment, and details are not described herein again.

S404. Obtain, within a preset time period, a first operation performed on the display screen.

The first operation includes but is not limited to one or more of the following operations: a pressure operation, a slide operation, a drag operation, a tap operation, a double-tap operation, a multi-contact operation, a button input, or a touch and hold input.

The preset time period may be set by a user, or may be preset in the electronic device and independent of a user. This is not limited herein.

S405. Determine second screen display data according to the first pressure value, the first operation, and a preset third data association relationship.

S406. Determine a second display attribute according to the first pressure value, the first operation, and a preset third display attribute association relationship.

attribute. That is, before display of the first screen display data ends, the touchscreen detects the first operation.

The third display attribute association relationship and/or the third data association relationship are/is preset and stored in the electronic device. The third display attribute association relationship includes an association relationship between the first pressure value, the first operation, and the display attribute. The third data association relationship includes an association relationship between the first pressure value, the first operation, and the screen display data. In an example, the third data association relationship and the third display attribute association relationship are respectively listed in the following Table 5 and Table 6. An association relationship included in the third data association relationship is not limited to content listed in Table 5, and an association relationship included in the third display attribute association relationship is not limited to content listed in Table 6.

TABLE 5

(Third data association relationship)

| | First operation | | | |
|---|---|---|---|---|
| First pressure value | Slide operation (downwards) | Slide operation (upwards) | Tap operation | Double-tap operation |
| 5 N to 7 N | Time and date | Time | Time and date | A lock-screen interface is displayed in full screen |
| 8 N to 9 N | Time, date, and weather | Time | Time, date, and weather | A lock-screen interface is displayed in full screen |
| 10 N to 12 N | Time, date, weather, and photographing button | Time and date | Time, date, weather, and photographing button | A lock-screen interface is displayed in full screen |

TABLE 6

(Third display attribute association relationship)

| | First operation | | | |
|---|---|---|---|---|
| First pressure value | Slide operation (downwards) | Slide operation (upwards) | Tap operation | Double-tap operation |
| 5 N to 7 N | Luminance 30% | Luminance 10% | Luminance 30% | Luminance 90% |
| 8 N to 9 N | Luminance 60% | Luminance 10% | Luminance 50% | Luminance 90% |
| 10 N to 12 N | Luminance 90% | Luminance 50% | Luminance 90% | Luminance 90% |

S407. Display, in the first portion of the display screen, the second screen display data according to the second display attribute, and stop displaying the first screen display data.

Figure 10:
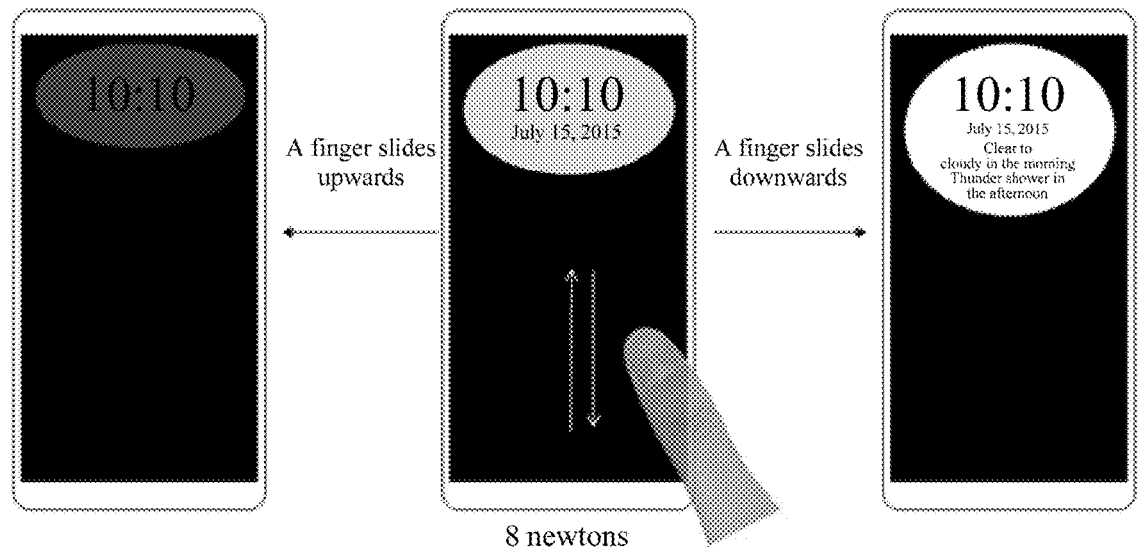
FIG. 10 is a schematic diagram of a display change after a display screen in FIG. 9 is partially lighted.

Specifically, if the touchscreen detects that the user performs a pressure operation on the touchscreen, and a first pressure value of the pressure operation is greater than the preset pressure operation threshold, the display screen of the electronic device is partially lighted, and the first screen display data is displayed in the first portion of the display screen according to the first display attribute. After the pressure operation ends, the touchscreen detects the first operation within the preset time period. Preferably, the preset time period is display duration in the first display For example, FIG. 10 is a schematic diagram of a display change after the display screen in FIG. 9 is partially lighted. As shown in FIG. 10, assuming that the first pressure value of the pressure operation is 8 N, the first screen display data is time information and date information, and the first display attribute is a display luminance 30%. After the first portion is lighted, the user performs the first operation on the touchscreen. According to Table 5 and Table 6, when it is detected that the first operation is an upward slide operation, screen display data decreases and becomes time information, that is, the second screen display data is time information; and a display luminance of the screen display data decreases to 10%, that is, the second display attribute is a display luminance 10%. When it is detected that the first operation is an upward slide operation, it is determined that the second screen display data is time information, date information, and weather information, and the second display attribute is a display luminance 60%. Therefore, the user can learn that, after the touchscreen is partially lighted, screen display data decreases and a display luminance of the screen display data decreases when an upward slide operation is performed on the touchscreen. In contrast, screen display data increases and a display luminance of the screen display data increases when a downward slide operation is performed on the touchscreen.

Optionally, an operation of lighting the full screen is preset. When the first operation is the preset operation of lighting the full screen, the display screen is fully lighted, and a lock-screen interface is displayed. For example, a double-tap operation is preset to the operation of lighting the full screen. After the touchscreen is partially lighted, if the touchscreen is double-tapped, the display screen is fully lighted, and the lock-screen interface is displayed.

Optionally, an area of the first portion is determined according to the first pressure value, the first operation, and a preset third display portion association relationship. The third display portion association relationship includes an association relationship between the first pressure value, the first operation, and the area of the first portion. For example, when the user performs a pressure operation whose first pressure value is 5 N on the touchscreen, the first portion of the display screen is lighted. A portion shape of the first portion is a square, and the portion area is 2 centimeters. Within a preset time period, when a tap operation is performed on the touchscreen again, the first portion increases and becomes a square whose portion area is 4 centimeters. That is, after the user performs the first operation on the touchscreen within the preset time period, the area of the first portion changes correspondingly. A specific form of the third display portion association relationship is not limited herein.

Optionally, in the method procedure in FIG. 9, only step S405 or step S406 may be performed. When only step S405 is performed, step S407 includes: displaying, in the first portion of the display screen, the second screen display data according to the first display attribute. When only step S406 is performed, step S407 includes: displaying, in the first portion of the display screen, the first screen display data according to the second display attribute.

In this embodiment of the present invention, when a display screen of an electronic device is in a disabled state, a first pressure value of a pressure operation performed on a touchscreen is obtained; and when the first pressure value is greater than or equal to a preset pressure operation threshold, the display screen is partially lighted to display screen display data. If a preset first operation is performed on the touchscreen within a preset time period after the display screen is partially lighted, screen display data and/or a display attribute are/is determined according to the first operation. The display screen is partially lighted by pressing the touchscreen, so that a user can view information of interest without fully lighting the display screen, thereby reducing power consumption caused by display in full screen. The preset first operation is performed on the touchscreen within the preset time period, so that the screen display data and/or the display attribute change/changes correspondingly, thereby improving intelligence of human-machine interaction.

Figure 11:
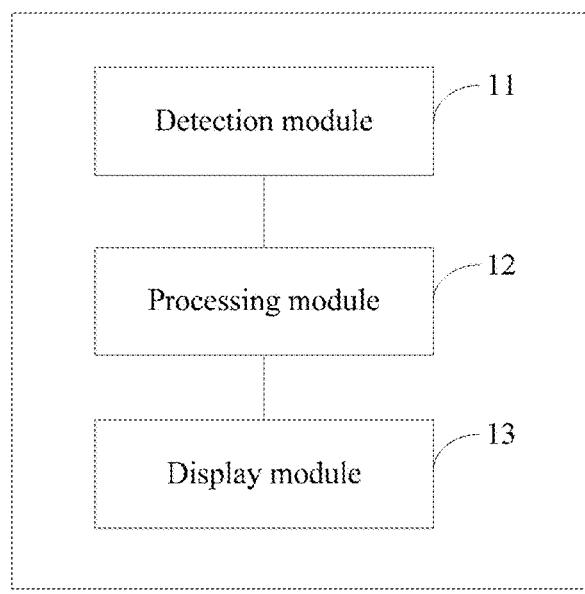
FIG. 11 is a schematic structural diagram of a screen enabling apparatus according to an embodiment of the present invention.

FIG. 11 is a schematic structural diagram of a screen enabling apparatus according to an embodiment of the present invention. The apparatus may be installed in a software form, and may run on an electronic device. As shown in FIG. 11, the apparatus includes: a detection module 11, a processing module 12, and a display module 13.

The detection module 11 is configured to: when a display screen of the electronic device is in a disabled state, detect a first pressure value of a pressure operation performed on a touchscreen of the electronic device.

The display screen includes a first portion and a second portion.

The processing module 12 is configured to: when the first pressure value is greater than or equal to a preset pressure operation threshold, determine to display, in the first portion of the display screen, first screen display data according to a first display attribute.

The first display attribute includes at least a display luminance.

The display module 13 is configured to display, in the first portion of the display screen, the first screen display data according to the first display attribute, where the second portion keeps in a disabled state or is displayed in black.

The processing module 12 is communicated with and connected to both the detection module 11 and the display module 13.

The apparatus in this embodiment is configured to perform the corresponding method steps in the foregoing method embodiment. An implementation principle of the apparatus is similar to that of the method embodiment, and details are not described herein again.

Optionally, the processing module 12 is further configured to determine the first screen display data according to the first pressure value and a preset first data association relationship, where the first data association relationship includes an association relationship between the pressure value and the screen display data.

Optionally, the processing module 12 is further configured to determine the first display attribute according to the first pressure value and a preset first display attribute association relationship, where the first display attribute association relationship includes an association relationship between the pressure value and the display attribute.

Optionally, the detection module 11 is further configured to obtain a first contact location of the touchscreen, in which the pressure operation is performed, corresponding to a time when the first pressure value is greater than or equal to the preset pressure operation threshold. The processing module 12 is further configured to determine a location, associated with the first contact location, of the first portion according to the first contact location.

Optionally, the detection module 11 is further configured to obtain pressure duration of the pressure operation performed on the touchscreen. The processing module 12 is further configured to: when the pressure duration exceeds a preset minimum duration threshold, determine the second display attribute according to an obtained second pressure value of the pressure operation and the first display attribute association relationship, where the first display attribute association relationship includes an association relationship between the pressure value and the display attribute. The display module 13 is further configured to display, in the first portion of the display screen, the first screen display data according to the second display attribute.

Optionally, the detection module 11 is further configured to obtain pressure duration of the pressure operation performed on the touchscreen.

The processing module 12 is further configured to: when the pressure duration exceeds a preset minimum duration threshold, determine the second screen display data according to an obtained second pressure value of the pressure operation and the first data association relationship, where the first data association relationship includes an association relationship between the pressure value and the screen display data.

The display module 13 is further configured to: display, in the first portion of the display screen, the second screen display data according to the first display attribute, and stop displaying the first screen display data.

Optionally, the detection module 11 is further configured to obtain pressure duration of the pressure operation performed on the touchscreen.

The processing module 12 is further configured to: when the pressure duration exceeds a preset minimum duration threshold, determine the second display attribute according to an obtained second pressure value of the pressure operation and the first display attribute association relationship, where the first display attribute association relationship includes an association relationship between the pressure value and the display attribute; and determine the second screen display data according to the obtained second pressure value and the first data association relationship, where the first data association relationship includes an association relationship between the pressure value and the screen display data.

The display module 13 is further configured to: display, in the first portion of the display screen, the second screen display data according to the second display attribute, and stop displaying the first screen display data.

Optionally, the processing module 12 is further configured to: when the first pressure value is greater than or equal to the preset pressure operation threshold, determine to display, in the preset first portion of the display screen, the preset first screen display data according to the preset first display luminance. The first display attribute association relationship includes an association relationship between the pressure value and the display luminance, and an increase of the pressure value is corresponding to an increase of the display luminance; and the first data association relationship includes an association relationship between the pressure value and the screen display data, and an increase of the pressure value is corresponding to an increase of the screen display data. The processing module 12 is further configured to determine the second display luminance according to the obtained second pressure value of the pressure operation and the first display attribute association relationship.

The display module 13 is further configured to: display, in the first portion of the display screen, the second screen display data according to the second display luminance, and stop displaying the first screen display data.

Optionally, the detection module 11 is further configured to obtain pressure duration of the pressure operation performed on the touchscreen.

The processing module 12 is further configured to: when the pressure duration exceeds a preset minimum duration threshold, determine the second display attribute according to the first pressure value, the pressure duration, and a preset second display attribute association relationship, where the second display attribute association relationship includes an association relationship between the first pressure value, the pressure duration, and the display attribute.

The display module 13 is further configured to: display, in the first portion of the display screen, the first screen display data according to the second display attribute.

Optionally, the detection module 11 is further configured to obtain pressure duration of the pressure operation performed on the touchscreen. The processing module 12 is further configured to: when the pressure duration exceeds a preset minimum duration threshold, determine the second screen display data according to the first pressure value, the pressure duration, and a preset second data association relationship, where the second data association relationship includes an association relationship between the first pressure value, the pressure duration, and the screen display data.

The display module 13 is further configured to: display, in the first portion of the display screen, the second screen display data according to the first display attribute, and stop displaying the first screen display data.

Optionally, the detection module 11 is further configured to obtain pressure duration of the pressure operation performed on the touchscreen.

The processing module 12 is further configured to: when the pressure duration exceeds a preset minimum duration threshold, determine the second display attribute according to the first pressure value, the pressure duration, and a preset second display attribute association relationship, where the second display attribute association relationship includes an association relationship between the first pressure value, the pressure duration, and the display attribute; and determine the second screen display data according to the first pressure value, the pressure duration, and a preset second data association relationship, where the second data association relationship includes an association relationship between the first pressure value, the pressure duration, and the screen display data.

The display module 13 is further configured to: display, in the first portion of the display screen, the second screen display data according to the second display attribute, and stop displaying the first screen display data.

Optionally, the detection module 11 is further configured to obtain, within a preset time period, a first operation performed on the display screen.

The processing module 12 is further configured to determine the second display attribute according to the first pressure value, the first operation, and a preset third display attribute association relationship, where the third display attribute association relationship includes an association relationship between the first pressure value, the first operation, and the display attribute.

The display module 13 is further configured to display, in the first portion of the display screen, the first screen display data according to the second display attribute.

Optionally, the detection module 11 is further configured to obtain, within a preset time period, a first operation performed on the display screen.

The processing module 12 is further configured to determine second screen display data according to the first pressure value, the first operation, and a preset third data association relationship, where the third data association relationship includes an association relationship between the first pressure value, the first operation, and the screen display data.

The display module 13 is further configured to: display, in the first portion of the display screen, the second screen display data according to the first display attribute, and stop displaying the first screen display data.

Optionally, the detection module 11 is further configured to obtain, within a preset time period, a first operation performed on the display screen.

The processing module 12 is further configured to: determine a second display attribute according to the first pressure value, the first operation, and a preset third display attribute association relationship, where the third display attribute association relationship includes an association relationship between the first pressure value, the first operation, and the display attribute; and determine second screen display data according to the first pressure value, the first operation, and a preset third data association relationship, where the third data association relationship includes an association relationship between the first pressure value, the first operation, and the screen display data.

The display module 13 is further configured to: display, in the first portion of the display screen, the second screen display data according to the second display attribute, and stop displaying the first screen display data.

Optionally, the detection module 11 is further configured to: when the first pressure value is greater than or equal to the preset pressure operation threshold, obtain a first contact location of the touchscreen, in which the pressure operation is performed, corresponding to a time when the first pressure value is greater than or equal to the preset pressure operation threshold.

The processing module 12 is further configured to: determine a first location, associated with the first contact location, of the first portion according to the first contact location; and determine the first screen display data according to the first location of the first portion and a preset lock-screen theme interface, where the first screen display data is screen display data, corresponding to the first location of the first portion, on the lock-screen theme interface.

The display module 13 is further configured to display, in the first location of the first portion of the display screen, the first screen display data.

Optionally, the detection module 11 is further configured to: when a contact moves in a process in which the pressure operation is continuously performed on the touchscreen, obtain a second contact location corresponding to a time when movement of the contact for the pressure operation stops.

The processing module 12 is further configured to: determine a second location, associated with the second contact location, of the first portion according to the second contact location; and determine the second screen display data according to the second location of the first portion and the preset lock-screen theme interface, where the second screen display data is screen display data, corresponding to the second location of the first portion, on the lock-screen theme interface.

The display module 13 is further configured to display, in the second location of the first portion of the display screen, the second screen display data.

The apparatus in this embodiment is configured to perform the corresponding method steps in the foregoing method embodiment. An implementation principle of the apparatus is similar to that of the method embodiment, and details are not described herein again.

In this embodiment of the present invention, when a display screen of an electronic device is in a disabled state, a first pressure value of a pressure operation performed on a touchscreen is obtained; and when the first pressure value is greater than or equal to a preset pressure operation threshold, the display screen is partially lighted to display screen display data. If the pressure operation continues to be performed on the touchscreen after the display screen is partially lighted, pressure duration is prolonged or the pressure value changes, or a preset first operation is performed on the touchscreen within a preset time period after the pressure operation ends. In this case, screen display data and/or a display attribute are/is determined according to the changed operation. The display screen is partially lighted by pressing the touchscreen, so that a user can view information of interest without fully lighting the display screen, thereby reducing power consumption caused by display in full screen. The pressure operation performed on the touchscreen continues or changes, or a new operation is performed, so that the screen display data and/or the display attribute change/changes correspondingly, thereby improving intelligence of human-machine interaction.

An embodiment of the present invention provides an electronic device. A structure of the electronic device is shown in FIG. 1 or FIG. 2. A touchscreen, a processor, and a display of the electronic device are separately configured to perform the method procedures in the foregoing method embodiment.

The touchscreen is configured to: when the display screen of the electronic device is in a disabled state, detect a first pressure value of a pressure operation performed on the touchscreen of the electronic device, where the display screen includes a first portion and a second portion.

The processor is configured to: when the first pressure value is greater than or equal to a preset pressure operation threshold, determine to display, in the first portion of the display screen, first screen display data according to a first display attribute, where the first display attribute includes at least a display luminance.

The display screen is configured to display, in the first portion of the display screen, the first screen display data according to the first display attribute, where the second portion keeps in a disabled state or is displayed in black.

Optionally, the touchscreen is further configured to obtain pressure duration of the pressure operation performed on the touchscreen.

The processor is further configured to: when the pressure duration exceeds a preset minimum duration threshold, determine the second display attribute according to an obtained second pressure value of the pressure operation and the first display attribute association relationship, where the first display attribute association relationship includes an association relationship between the pressure value and the display attribute; and determine the second screen display data according to the obtained second pressure value and the first data association relationship, where the first data association relationship includes an association relationship between the pressure value and the screen display data.

The display screen is further configured to: display, in the first portion of the display screen, the second screen display data according to the second display attribute, and stop displaying the first screen display data.

Optionally, the touchscreen is further configured to obtain pressure duration of the pressure operation performed on the touchscreen.

The processor is further configured to: when the pressure duration exceeds a preset minimum duration threshold, determine the second display attribute according to the first pressure value, the pressure duration, and a preset second display attribute association relationship, where the second display attribute association relationship includes an association relationship between the first pressure value, the pressure duration, and the display attribute; and determine the second screen display data according to the first pressure value, the pressure duration, and a preset second data association relationship, where the second data association relationship includes an association relationship between the first pressure value, the pressure duration, and the screen display data.

The display screen is further configured to: display, in the first portion of the display screen, the second screen display data according to the second display attribute, and stop displaying the first screen display data.

Optionally, the touchscreen is further configured to: obtain, within a preset time period, a first operation performed on the display screen.

The processor is further configured to: determine a second display attribute according to the first pressure value, the first operation, and a preset third display attribute association relationship, where the third display attribute association relationship includes an association relationship between the first pressure value, the first operation, and the display attribute; and determine second screen display data according to the first pressure value, the first operation, and a preset third data association relationship, where the third data association relationship includes an association relationship between the first pressure value, the first operation, and the screen display data.

The display screen is further configured to: display, in the first portion of the display screen, the second screen display data according to the second display attribute, and stop displaying the first screen display data.

The electronic device in this embodiment is configured to perform the corresponding method steps in the foregoing method embodiment. An implementation principle of the electronic device is similar to that of the method embodiment, and details are not described herein again.

In this embodiment of the present invention, when a display screen of an electronic device is in a disabled state, a first pressure value of a pressure operation performed on a touchscreen is obtained; and when the first pressure value is greater than or equal to a preset pressure operation threshold, the display screen is partially lighted to display screen display data. If the pressure operation continues to be performed on the touchscreen after the display screen is partially lighted, pressure duration is prolonged or the pressure value changes, or a preset first operation is performed on the touchscreen within a preset time period after the pressure operation ends. In this case, screen display data and/or a display attribute are/is determined according to the changed operation. The display screen is partially lighted by pressing the touchscreen, so that a user can view information of interest without fully lighting the display screen, thereby reducing power consumption caused by display in full screen. The pressure operation performed on the touchscreen continues or changes, or a new operation is performed, so that the screen display data and/or the display attribute change/changes correspondingly, thereby improving intelligence of human-machine interaction.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform some steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing functional modules is used as an example for description. In actual application, the foregoing functions can be allocated to different functional modules and implemented according to a requirement, that is, an inner structure of an apparatus is divided into different functional modules to implement all or some of the functions described above. For a detailed working process of the foregoing apparatus, refer to a corresponding process in the foregoing method embodiments, and details are not described herein again.

Finally, it should be noted that the foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A screen enabling method, comprising: detecting, by an electronic device, a first pressure value of a pressure operation performed on a touchscreen of the electronic device when a display screen of the electronic device is in a disabled state, wherein the display screen comprises a first portion and a second portion; and displaying, by the electronic device in the first portion of the display screen, first screen display data according to a first display attribute when the first pressure value is greater than or equal to a preset pressure operation threshold in the second portion, wherein the second portion keeps in a disabled state or is displayed in black, and the first display attribute comprises at least a display luminance.

2. The screen enabling method according to claim 1, wherein before displaying the first screen display data, the method further comprises:
   determining, by the electronic device, the first screen display data according to the first pressure value and a preset first data association relationship, wherein the preset first data association relationship comprises an association relationship between a pressure value and screen display data.

3. The screen enabling method according to claim 1, wherein before displaying the first screen display data, the method further comprises:
   determining, by the electronic device, the first display attribute according to the first pressure value and a preset first display attribute association relationship, wherein the preset first display attribute association relationship comprises an association relationship between a pressure value and a display attribute.

4. The screen enabling method according to claim 1, wherein before displaying the first screen display data, the method further comprises:
   obtaining, by the electronic device, a first contact location of the touchscreen, in which the pressure operation is performed, associated with a time when the first pressure value is greater than or equal to the preset pressure operation threshold; and
   determining, by the electronic device, a location, associated with the first contact location, of the first portion according to the first contact location.

5. The screen enabling method according to claim 1, wherein after displaying the first screen display data, the method further comprises:
   obtaining, by the electronic device, pressure duration of the pressure operation performed on the touchscreen;
   determining, by the electronic device, a second display attribute according to an obtained second pressure value of the pressure operation and a preset first display attribute association relationship when the pressure duration exceeds a preset minimum duration threshold, wherein the preset first display attribute association relationship comprises an association relationship between a pressure value and a display attribute; and
   displaying, by the electronic device in the first portion of the display screen, the first screen display data according to the second display attribute.

6. The screen enabling method according to claim 1, wherein after displaying the first screen display data, the method further comprises:
   obtaining, by the electronic device, pressure duration of the pressure operation performed on the touchscreen;
   determining, by the electronic device, a second screen display data according to an obtained second pressure value of the pressure operation and a preset first data association relationship when the pressure duration exceeds a preset minimum duration threshold, wherein the preset first data association relationship comprises an association relationship between a pressure value and screen display data; and
   displaying, by the electronic device in the first portion of the display screen, the second screen display data according to the first display attribute, and stopping displaying the first screen display data.

7. The screen enabling method according to claim 1, wherein after displaying the first screen display data, the method further comprises:
   obtaining, by the electronic device, pressure duration of the pressure operation performed on the touchscreen;
   determining, by the electronic device, a second display attribute according to an obtained second pressure value of the pressure operation and a preset first display attribute association relationship when the pressure duration exceeds a preset minimum duration threshold, wherein the preset first display attribute association relationship comprises an association relationship between a pressure value and a display attribute;
   determining, by the electronic device, a second screen display data according to the obtained second pressure value and a preset first data association relationship, wherein the preset first data association relationship comprises an association relationship between a pressure value and screen display data; and
   displaying, by the electronic device in the first portion of the display screen, the second screen display data according to the second display attribute, and stopping displaying the first screen display data.

8. The screen enabling method according to claim 1, wherein after displaying the first screen display data, the method further comprises:
   obtaining, by the electronic device, pressure duration of the pressure operation performed on the touchscreen;
   determining, by the electronic device, a second display attribute according to the first pressure value, the pressure duration, and a preset second display attribute association relationship when the pressure duration exceeds a preset minimum duration threshold, wherein the preset second display attribute association relationship comprises an association relationship among a pressure value, pressure duration, and a display attribute; and
   displaying, by the electronic device in the first portion of the display screen, the first screen display data according to the second display attribute.

9. The screen enabling method according to claim 1, wherein after displaying the first screen display data, the method further comprises:
   obtaining, by the electronic device within a preset time period, a first operation performed on the display screen;
   determining, by the electronic device, a second display attribute according to the first pressure value, the first operation, and a preset third display attribute association relationship, wherein the preset third display attribute association relationship comprises an association relationship among a pressure value, an operation, and a display attribute; and
   displaying, by the electronic device in the first portion of the display screen, the first screen display data according to the second display attribute.

10. The screen enabling method according to claim 1, wherein displaying, in the first portion of the display screen, the first screen display data according to the first display attribute when the first pressure value is greater than or equal to the preset pressure operation threshold comprises:
   obtaining, by the electronic device, a first contact location of the touchscreen, in which the pressure operation is performed when the first pressure value is greater than or equal to the preset pressure operation threshold, associated with a time when the first pressure value is greater than or equal to the preset pressure operation threshold;
   determining, by the electronic device, a first location, associated with the first contact location, of the first portion according to the first contact location;
   determining, by the electronic device, the first screen display data according to the first location of the first portion and a preset lock-screen theme interface, wherein the first screen display data is screen display data, associated with the first location of the first portion, on the preset lock-screen theme interface; and displaying, by the electronic device in the first location of the first portion of the display screen, the first screen display data.

11. An electronic device, comprising: a touchscreen, configured to detect a first pressure value of a pressure operation performed on the touchscreen of the electronic device when a display screen of the electronic device is in a disabled state, wherein the display screen comprises a first portion and a second portion; a processor, configured to determine to display, in the first portion of the display screen, first screen display data according to a first display attribute when the first pressure value is greater than or equal to a preset pressure operation threshold in the second portion, wherein the first display attribute comprises at least a display luminance; and the display screen, configured to display, in the first portion of the display screen, the first screen display data according to the first display attribute, wherein the second portion keeps in a disabled state or is displayed in black.

12. The electronic device according to claim 11, wherein the processor is further configured to:
determine the first screen display data according to the first pressure value and a preset first data association relationship, wherein the preset first data association relationship comprises an association relationship between a pressure value and screen display data.

13. The electronic device according to claim 11, wherein the processor is further configured to:
determine the first display attribute according to the first pressure value and a preset first display attribute association relationship, wherein the first preset display attribute association relationship comprises an association relationship between a pressure value and a display attribute.

14. The electronic device according to claim 11, wherein the touchscreen is further configured to:
obtain a first contact location of the touchscreen, in which the pressure operation is performed, associated with a time when the first pressure value is greater than or equal to the preset pressure operation threshold; and
wherein the processor is further configured to:
determine a location, associated with the first contact location, of the first portion according to the first contact location.

15. The electronic device according to claim 11, wherein the touchscreen is further configured to obtain pressure duration of the pressure operation performed on the touchscreen;
wherein the processor is further configured to:
determine a second display attribute according to an obtained second pressure value of the pressure operation and a preset first display attribute association relationship when the pressure duration exceeds a preset minimum duration threshold, wherein the preset first display attribute association relationship comprises an association relationship between a pressure value and a display attribute; and
wherein the display screen is further configured to:
display, in the first portion of the display screen, the first screen display data according to the second display attribute.

16. The electronic device according to claim 11, wherein the touchscreen is further configured to:
obtain pressure duration of the pressure operation performed on the touchscreen;
wherein the processor is further configured to:
determine a second screen display data according to an obtained second pressure value of the pressure operation and a preset first data association relationship when the pressure duration exceeds a preset minimum duration threshold, wherein the preset first data association relationship comprises an association relationship between a pressure value and screen display data; and
wherein the display screen is further configured to:
display, in the first portion of the display screen, the second screen display data according to the first display attribute, and stop displaying the first screen display data.

17. The electronic device according to claim 11, wherein the touchscreen is further configured to:
obtain pressure duration of the pressure operation performed on the touchscreen;
wherein the processor is further configured to:
determine a second display attribute according to an obtained second pressure value of the pressure operation and a preset first display attribute association relationship when the pressure duration exceeds a preset minimum duration threshold, wherein the preset first display attribute association relationship comprises an association relationship between a pressure value and a display attribute; and
determine second screen display data according to the obtained second pressure value and the first data association relationship, wherein the preset first data association relationship comprises an association relationship between a pressure value and screen display data; and
wherein the display screen is further configured to:
display, in the first portion of the display screen, the second screen display data according to the second display attribute, and stop displaying the first screen display data.

18. The electronic device according to claim 11, wherein the touchscreen is further configured to:
obtain pressure duration of the pressure operation performed on the touchscreen;
wherein the processor is further configured to:
determine a second display attribute according to the first pressure value, the pressure duration, and a preset second display attribute association relationship when the pressure duration exceeds a preset minimum duration threshold, wherein the preset second display attribute association relationship comprises an association relationship among a pressure value, pressure duration, and a display attribute; and
wherein the display screen is further configured to:
display, in the first portion of the display screen, the first screen display data according to the second display attribute.

19. The electronic device according to claim 11, wherein the touchscreen is further configured to:
obtain, within a preset time period, a first operation performed on the display screen;
wherein the processor is further configured to:
determine a second display attribute according to the first pressure value, the first operation, and a preset third display attribute association relationship, wherein the preset third display attribute association relationship comprises an association relationship among a pressure value, an operation, and a display attribute; and
wherein the display screen is further configured to:

display, in the first portion of the display screen, the first screen display data according to the second display attribute.

20. The electronic device according to claim 11, wherein the touchscreen is further configured to:
obtain a first contact location of the touchscreen, in which the pressure operation is performed when the first pressure value is greater than or equal to the preset pressure operation threshold, associated with a time when the first pressure value is greater than or equal to the preset pressure operation threshold;
wherein the processor is further configured to:
determine a first location, associated with the first contact location, of the first portion according to the first contact location; and
determine the first screen display data according to the first location of the first portion and a preset lock-screen theme interface, wherein the first screen display data is screen display data, associated with the first location of the first portion, on the preset lock-screen theme interface; and
wherein the display screen is further configured to:
display, in the first location of the first portion of the display screen, the first screen display data.

\* \* \* \* \*